United States Patent
Jansen et al.

[11] Patent Number: 6,066,441
[45] Date of Patent: May 23, 2000

[54] PROCESSING OF RADIOGRAPHIC MATERIALS HAVING EMULSION GRAINS RICH IN SILVER CHLORIDE

[75] Inventors: Benedictus Jansen, Geel; Freddy Henderickx, Olen; Ann Verbeeck, Begijnendijk; Frank Michiels, Arendonk, all of Belgium

[73] Assignee: Agfa-Gevaert, N.V., Mortsel, Belgium

[21] Appl. No.: 09/303,545

[22] Filed: May 3, 1999

Related U.S. Application Data

[60] Provisional application No. 60/095,474, Aug. 5, 1998.

[51] Int. Cl.$^7$ ........................................ G03C 5/26
[52] U.S. Cl. .................................. 430/440; 430/446
[58] Field of Search ..................... 430/440, 446

[56] References Cited

U.S. PATENT DOCUMENTS

| | | | |
|---|---|---|---|
| 5,618,661 | 4/1997 | Sampei | 430/446 |
| 5,648,205 | 7/1997 | Okutsu | 430/446 |
| 5,766,832 | 6/1998 | Nishio | 430/446 |
| 5,780,209 | 7/1998 | Yamashita | 430/446 |

FOREIGN PATENT DOCUMENTS 0 678 772 A1   10/1995   European Pat. Off.

*Primary Examiner*—Hoa Van Le
*Attorney, Agent, or Firm*—Breiner & Breiner

[57] ABSTRACT

A method is disclosed of processing an exposed black-and-white light-sensitive silver halide photographic material having silver halide, coated in an amount, expressed as an equivalent amount of silver nitrate of less than 6 g/m$^2$ comprising the steps of developing, fixing, rinsing and drying, making use in the developing step of an ascorbic acid type developer and of an equivalent developer replenisher providing a regeneration amount of less than 150 ml/m$^2$, characterized in that the said material has a buffering capacity of less than 6 mmole/m$^2$, wherein said buffering capacity is defined as the amount of alkali, expressed in mmole/square meter, required to bridge across pH differences between the material and the developer.

9 Claims, 2 Drawing Sheets

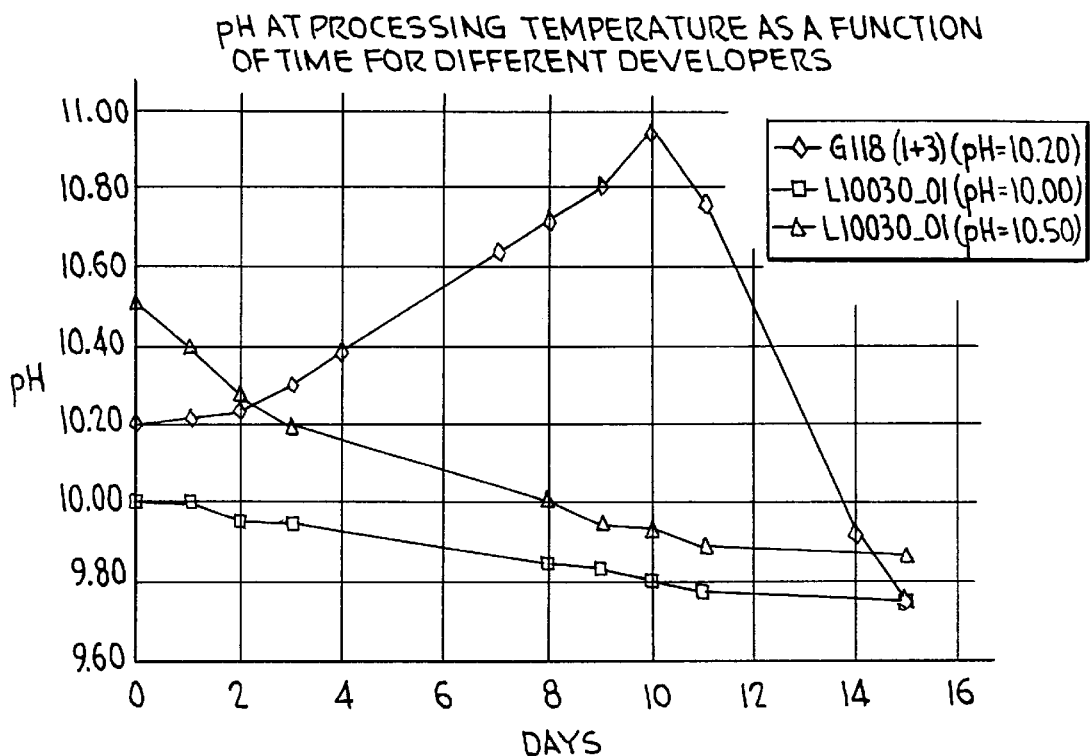
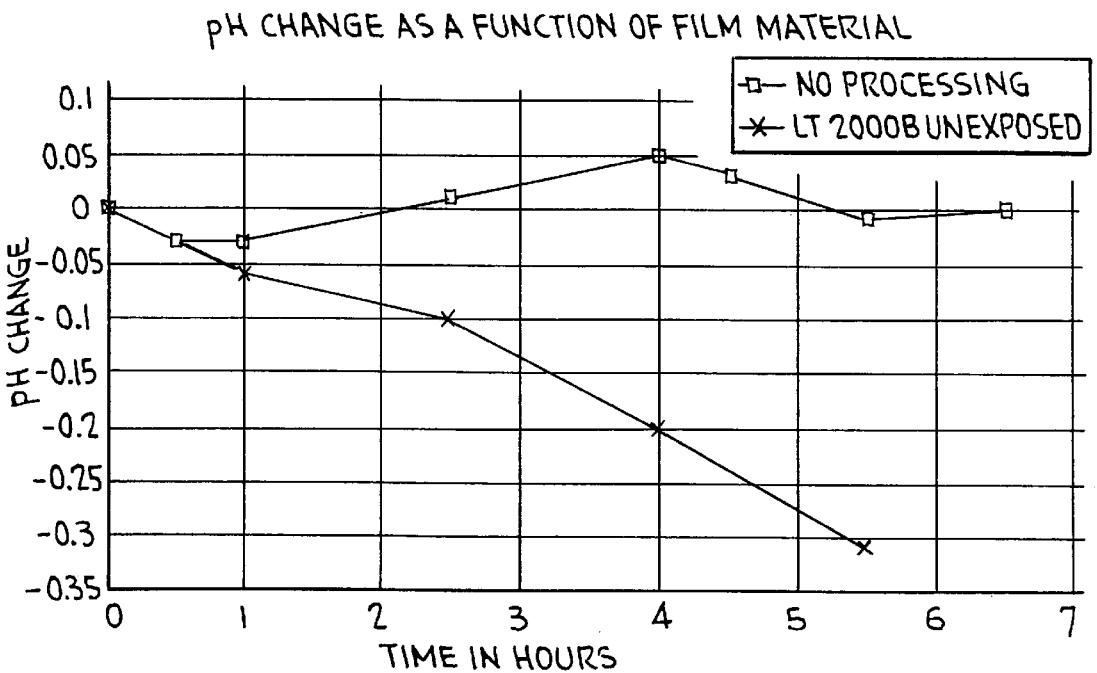

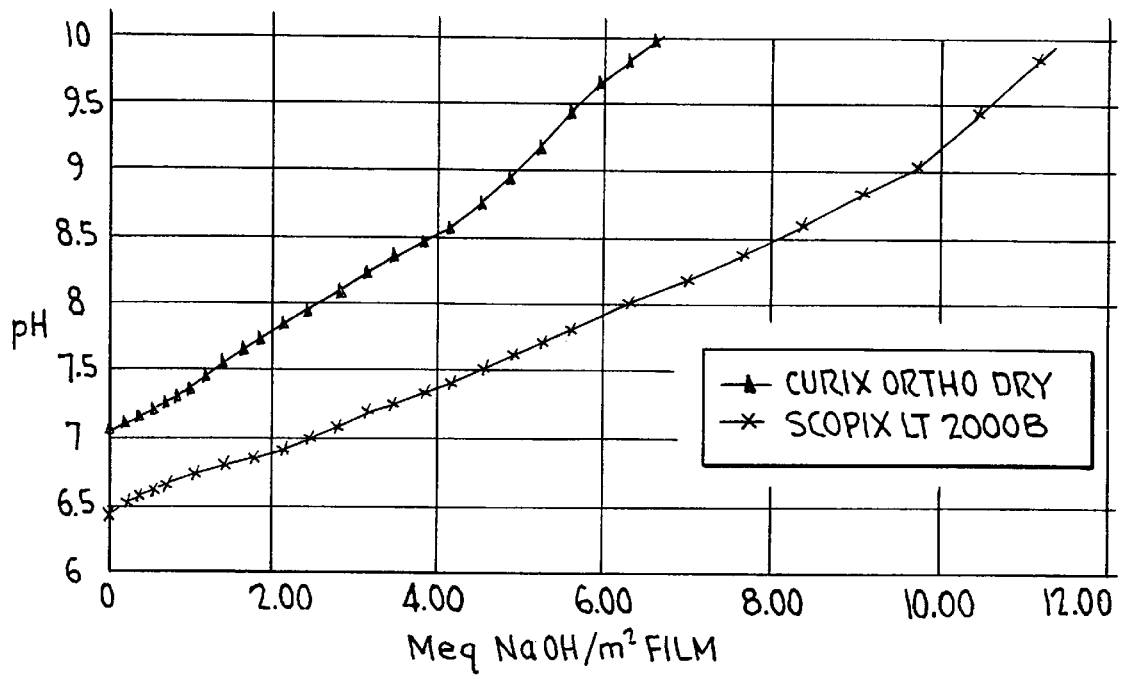
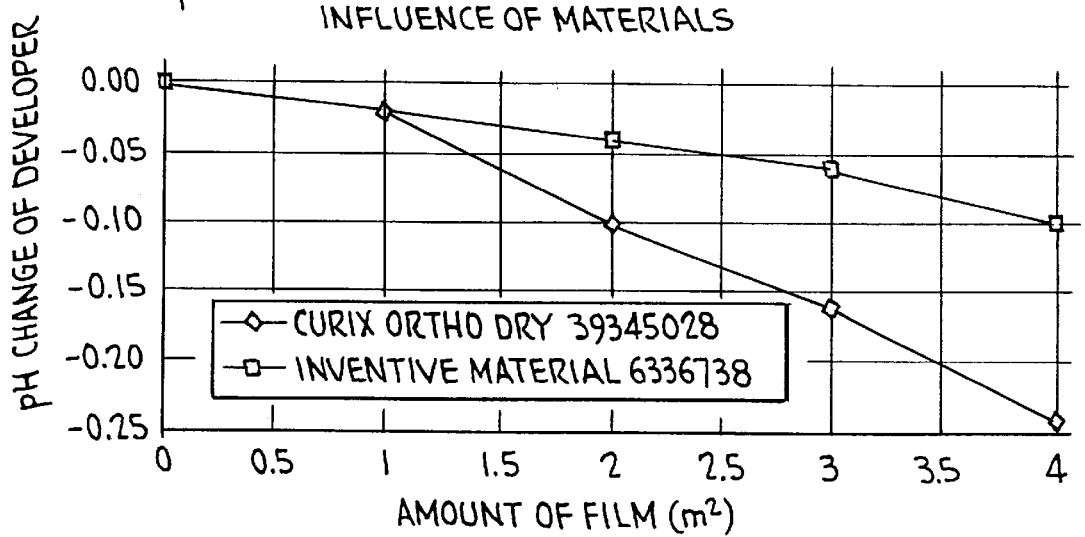

PROCESSING OF RADIOGRAPHIC MATERIALS HAVING EMULSION GRAINS RICH IN SILVER CHLORIDE

This application claims benefit of provisional application No. 60/095,474 filed Aug. 05, 1998.

DESCRIPTION

1. Field of the Invention

The present invention relates to X-ray photographic materials and a method of processing said X-ray photographic materials having emulsion grains rich in silver chloride, making use of an ascorbic acid developer and of low developer replenishing amounts.

2. Background of the Invention

Buffering of pH of developers used in the processing of light-sensitive silver halide photographic materials in order to provide a suitable conservation of the said developers is well-known as has e.g. been described in EP-A 0 632 323, wherein a lith developer has been disclosed having a pH between 9 and 11 with a combination of buffering agents, in EP-A 0 736 802 wherein use of borate and carbonate as buffering compounds of ascorbic acid type developers has been disclosed, in EP-A 0753 793, wherein a combination of phosphate, carbonate en borate buffering agents has been described in order to make the developing solution stable to aerial oxidation and in Research Disclosure 37152, p. 185–224, published Mar. 1, 1995, wherein the use in photography of ascorbid acid and related compounds has been disclosed with high concentrations of carbonate as a buffering agent.

WO 93/12463 discloses specific mixtures of reducing agents useful in order to minimize pH changes due to aerial oxidation. U.S. Pat. No. 5,503,965 discloses a developer replenisher having a pH higher by more than 0.5 pH units if compared with the starting developing solution and furthermore discloses the use of high levels of buffering agents in ascorbic acid developers. EP-A 0 573 700 describes the use of a developing replenishing solution with a higher pH than the developing solution, in order to compensate for the pH decrease of the developer solution. U.S. Pat. No. 5,648,205 discloses a black-and-white developing solution containing ascorbic acid, a superadditive developing agent, an alkaline agent, carbonate and a carboxyalkyl disulfide or mercaptan. In this patent pH values are between 9.2 and 9.8 and the carbonate buffer has a concentration between 0.3 and 0.6 molar: in the presence of lower carbonate concentrations sensitivity loss is encountered. Use of high concentrations of carbonate (more than 0.5 molar) in order to stabilize the photographic activity of ascorbic acid developers has been described in U.S. Pat. Nos. 5,236,816 and 5,264,323.

In EP-A 0 552 511 use has been made of a pH or redox measurement system and a way to feed alkaline solution into the developing solution in order to keep the pH of the developing solution more stable. Another possibility of setting free alkaline agents makes use in the developing step of zinc sulfide in the layer of a receptor element for complexing silver halide, wherein said element contains a triazole com-pound as a stabilizing agent and a metal sulfide as has been described in EP-A 0 356 581 and in the ecologically clean rapid processing of silver halide emulsions described in EP-A's 0 221 599 and 0 290 077.

In EP-A 0 731 382 a method has further been disclosed for processing an emulsion rich in silver chloride with developers from the ascorbic acid type at low regeneration rate, making use in the developer of an oxyalkylene compound having a quaternary heterocyclic ammonium group as a development accelerator. In EP-A 0 732 619 use of an ascorbic acid type developer, containing thiocyanate and having a pH between 9.6 and 11.0 has been recommended. In order to allow low replenishment rates it has been recommended in EP-A 0 774 687 to make use therfore of an ascorbic acid developer containing mainly sodium metal cations.

The problem encountered however remains the sensitometric instability due to pH shift during conservation of developers of the ascorbic acid type, particularly when only low amounts of chemistry are used due to the processing over a long period of time of low amounts of silver halide material having emulsion grains rich in silver chloride. It has indeed been observed that when use is made of a developer containing ascorbic acid that pH stability is questionable. In the developing step and, moreover, by air oxidation, pH tends to decrease in an "ascorbic acid developer". Opposite thereto in a developer having hydroquinone as main developing agent pH tends to increase by contact with oxygen in the air, whereas developing makes pH decrease just as in the presence of ascorbic acid. In a "hydroquinone developer" decreasing developing activity due to the development of low amounts of film over a long period, accompanied by low developer replenishing amounts, is compensated by the said pH increase by air oxidation. This is clearly not the case for "ascorbid acid developers" as "developing activity" and "air oxidation" are working into the same direction of pH decrease, thereby causing inactivation of the developer.

As nowadays the tendency is met to promote the use of low replenishing amounts for reasons of ecology (the need to minimize amounts of waste material) developing agents are left in the processor over a longer period of time and the influence of oxidation is more pronounced. Developers containing ascorbic acid are thus more sensitive with respect to the disadvantages as set forth.

As otherwise there is a tendency to combine the use of low replenishing amounts and rapid processing the need is present to have photographic materials comprising light-sensitive layers with silver halide emulsion crystals having a very good developablity. From the point of view of solubility it is clear that silver halide emulsions having grains or crystals rich in silver chloride are preferred. A difference in solubility with a factor of $10^2$ is not only significant in the developing step but also in the fixation step, when a comparison is made between grains rich in silver chloride and grains rich in silver bromide. As moreover the specific surface or surface to volume ratio is much larger for tabular than for cubic grains having an equal equivalent volume diameter it is clear that tabular grains are preferred.

Further it is well-known that developers cannot contain buffering agents in unlimited amounts. Decisive therefore are e.g. desalting effects, solubility problems and the preparation of concentrated solutions, also called "concentrates". A limiting value with respect to buffering agents in a developer is in the range from about 0.5 up to 0.8 mole per liter.

Minimization of coating amounts of silver halide in the light-sensitive photographic material has a positive influence on pH decrease during film processing, in that also the said decrease is minimized. Depending on boundary conditions as there are e.g. sensitometry and image quality for X-ray film materials minimum coating amounts of silver are e.g. in the range from 3 to 10 g of silver, expressed as an equivalent amount of silver nitrate.

OBJECTS OF THE INVENTION

It is an object of the present invention to provide a method of processing black-and-white light-sensitive silver halide photographic materials in ascorbic acid type developers wherein said processing is performed at low replenishment rates, thereby providing a stable or constant sensitometry.

It is a further object to provide black-and-white light-sensitive silver halide photographic materials suitable to the processing method as set forth above.

Further objects will become apparent from the description hereinafter.

SUMMARY OF THE INVENTION

The above mentioned objects are realized by providing a method of processing an exposed black-and-white light-sensitive silver halide photographic material having silver halide, coated in an amount, expressed as an equivalent amount of silver nitrate of less than 6 g/m$^2$ comprising the steps of developing, fixing, rinsing and drying, making use in the developing step of an ascorbic acid type developer and of an equivalent developer replenisher providing a regeneration amount of less than 150 ml/m$^2$, characterized in that the said material has a buffering capacity of less than 6 mmole/m$^2$, preferably of less than 4 mmole/m$^2$ and even more preferably less than 2.5 mmole/m$^2$, wherein said buffering capacity is defined as the amount of alkali, expressed in mmole/square meter required to bridge across pH differences between the material and the developer.

In a preferred embodiment said processing proceeds in a total dry-to-dry processing time of less than 100 seconds.

Specific features for preferred embodiments of the invention are disclosed in the dependent claims.

Said material having a buffering capacity of less than 6 mmole/m$^2$, preferably of less than 4 mmole/m$^2$ and even more preferably less than 2.5 mmole/m$^2$ has also been described.

Further advantages and embodiments of the present invention will become apparent from the following description.

BRIEF DESCRIPTION OF THE DRAWINGS

FIG. 1 shows changes in pH at the processing temperature as a function of time (expressed in "days") for developer solutions standing in an open beaker in order to promote contact with atmospheric oxygen, wherein said open beaker contains as developing solutions G118 (trademarketed developer from Agfa-Gevaert, the pH of which is 10.20); L10030$_{13}$ 01 (experimental developer containing iso-ascorbic acid, the pH of which is 10.00) and L10030$_{13}$ 01 (experimental developer containing iso-ascorbic acid, the pH of which is 10.50); respectively.

FIG. 2 is illustrative for changes in pH occurring during development of an unexposed material in a "Agfa Gevaset N437" processor (tradename product from Agfa-Gevaert) for experiments without and with processing of the said unexposed materials, making use therein from experimental developer L10030-01 and experimental fixer L10031-01, the compositions of which have been given hereinafter.

FIG. 3 gives a plot of pH versus amount of alkali (expressed in meq/square meter) for a double-side coated "Agfa Curix Ortho Dry" radiographic material and for the single-side coated "LT2000B" laser material film (see EP-A 0 794 456 and corresponding U.S. Pat. No. 5,712,081).

FIG. 4. Change of pH in the developer for batch-processing (with exhaustion of the developer) for comparative and inventive materials having differing acid contents.

DETAILED DESCRIPTION OF THE INVENTION

While the present invention will hereinafter be described in connection with preferred embodiments thereof, it will be understood that it is not intended to limit the invention to those embodiments.

First of all the "buffering capacity" and a method to measure the said buffering capacity of film materials is defined. Therefore 0.15 square meter of unexposed film is cut into small pieces (10 mm×3 mm). The film pieces are brought into 500 ml of deionized water at room temperature and stirred. By addition of 0.1 M of NaOH the pH of the solution is slowly increased and the pH of the solution in equilibrium with the film is measured as a function of the amount of NaOH added. The addition is slow, in order to obtain a good equilibrium between film and fluid (typically from pH 7 to pH 10 within a time of 3 hours). The data are calculated per square meter of film.

A plot of pH versus amount of alkali (expressed in mmole/square meter) is made. The amount of alkali (mmole/square meter) required to bridge across pH differences between the material and the developer by adding to the material, cut into small pieces and put in deionized water, said alkali in order to obtain the pH of the developing solution in which the film is developed as described above, is defined as the "buffering capacity" of the film.

The extent to which the said "buffering capacity" causes (or prevents) a quicker (or slower) decrease in the pH of the developing solution is largely dependent on the buffering capacity of the developing solution and on regeneration quotes. When use is made e.g. of high amounts of buffering agents in the developing solution and high regeneration quotes, the difference in pH between the developer replenisher and the developing solution will be smaller.

If the film must be developed in a highly alkaline developing solution (e.g. at a pH of 11.5 as in lith development), the buffering capacity is the amount of alkali necessary to obtain a pH of 11.5. In case of ascorbic acid developers, the pH of the developing solution is typically between 9.5 and 10.

It is thus clear that the buffering capacity is not solely a characteristic of the film, since the amount of alkali is dependent on the pH of the development solution: the buffering capacity of the film as defined here indeed is a characteristic of the film material for a specific pH of the development solution.

It is well known that the amount of alkali necessary during development is largely dependent on two factors:

1. the amount of silver to be developed (g/m2);
2. the amount of acid released during the development reaction (mmoles of hydrogen ions released per mole of developed silver).

We have found now that, apart from these factors, which were known before, there is another important contribution. In particular in the case of ascorbic acid developers, used at low regeneration rates, this contribution becomes important. We have indeed unexpectedly found now that certain materials perform appreciably better in these systems than others and that the main factor which causes these differences is the buffer capacity of the film materials.

Photographic development may be performed in various ways. The addition of fresh developing solution can be performed in a number of ways. We basically discern two types:

1. batch processing, in which a batch of fresh chemistry is used untill the photographic activity is decreased below a certain level;

2. regeneration or replenishing processing, in which the developing solution is topped up with fresh developing solution (replenishing solution, called "developer replenisher"). In this case, the purpose is to obtain a constant photographic activity at an acceptable level. Used developer solution overflows and is discarded. It is clear that there are a number of other possibilities, e.g. where overflowed developer is collected, rejuvenated and (partially) re-used as replenishment solution. It is possible that the developer is used with replenisher, whereas a batch process is used for the fixing step, etc.

When using batch processing, the definition of regeneration quotes is rather difficult, since there is performed no actual replenishment. However, it is clear that in this case the photographic performance will drop as more and more film is being developed in the same batch of developer. In a batch of 2000 ml of fresh developer, photographic performance may e.g. be acceptable up to processing of 10 m2 of film. In this case, the equivalent regeneration rate would be 200 ml/m2. In the text described here, we usually refer to a regeneration system. However, the system may equally well be a batch system with equivalent regeneration rates.

Influence of Layer Composition on Buffering Capacity.

It is clear that a large number of components which are present in the different layers of the photographic material will contribute to the overall buffering capacity. According to the present invention a silver halide photographic material has thus been provided wherein said material comprises components the contribution of which leads to minimization of the buffering capacity: said material has a buffering capacity of less than 6 mmole/m$^2$, preferably of less than 4 mmole/m$^2$ and even more preferably less than 2.5 mmole/m$^2$.

Moreover the material according to the present invention has a ratio of buffering capacity to silver content in the undeveloped film below 0.6, and even more preferred below 0.4, wherein said silver content is expressed as equivalent amount of silver nitrate.

A method of processing has thus, according to the present invention, also been provided wherein said method comprises the steps of developing, fixing, rinsing and drying, making use in the developing step of an ascorbic acid type developer and an equivalent developer replenisher providing a regeneration amount of less than 150 ml/m$^2$, characterized in that the said material has a buffering capacity of less than 6 mmole/m$^2$ and wherein said material has a ratio of buffering capacity to silver content in the undeveloped film below 0.6, and more preferably below 0.4, wherein said silver content of said exposed black-and-white light-sensitive silver halide photographic material having silver halide, coated in an amount of less than 6 g/m$^2$, is again expressed as an equivalent amount of silver nitrate.

Since the photographic materials are coated from different coating solutions which e.g. compose the emulsion or antistress layer, the easiest way to determine their contribution to the buffering capacity of the different layer which constitute the complete material is to titrate the gelatinous coating solutions in order to estimate the contribution of the different layers to the total buffering capacity of the whole material.

For the coating solutions of the different layers of the photographic material, the contribution of the different components can be estimated by titrating the components themselves. This allows a fast and efficient screening of the different sources of buffering capacity and allows corrective measures.

From our experience, following classes are thought to be important in the total buffering capacity.

1. Buffer solutions used to adapt pH during the manufacturing process of the different layers and/or photographic components. During the manufacturing of the coating composition of photographic layers, there are numerous adaptations of the pH. These adaptations can be performed using different compositions. E.g. a pH decrease from 6 to 4 can be performed using nitric acid, acetic acid or citric acid. If citric acid is used, this will have a higher contribution to the buffering capacity, since it is a tribasic acid. Use of a monobasic acid like acetic acid is therefore better. Also pKa values are important: the acids used to adjust the pH value should preferably not have pKa values corresponding to pH values between the pH of the coating solution and the development solution.

2. Different components as e.g. antistatic agents used for electrical conductivity, accelerators or activators promoting developability, agents to prevent pressure marks, agents providing good drying properties, etc.

3. Decrease of the gelatin content or use of different gelatin types may also be used to make the buffering capacity decrease. However, the gelatin content is usually already reduced to minimum amounts, in order to provide e.g. rapid processing ability and the gelatin content is usually determined by other factors like suitable sensitometry (e.g. speed, gradation), prevention of pressure marks, etc.

4. Coating pH, inclusive (usually small) differences in pH between adjacent layers.

A method is thus provided of processing an exposed black-and-white light-sensitive silver halide photographic material having silver halide, coated in an amount, expressed as an equivalent amount of silver nitrate of less than 6 g/m$^2$, said method comprising the steps of developing, fixing, rinsing and drying, making use in the developing step of an ascorbic acid type developer and an equivalent developer replenisher providing a regeneration amount of less than 150 ml/m$^2$, characterized in that the said material has a buffering capacity of less than 6 mmole/m$^2$. More preferably said material has a buffering capacity of less than 4 mmole/m$^2$, and still more preferably said material has a buffering capacity of less than 2.5 mmole/m$^2$.

According to the method of the present invention the black-and-white light-sensitive silver halide photographic material having silver halide, coated in an amount, expressed as an equivalent amount of silver nitrate of less than 6 g/m$^2$ material comprises a support and on at least one side thereof at least one light-sensitive emulsion layer having tabular emulsion grains rich in silver chloride.

In one embodiment according to the method of the present invention the said tabular grains rich in silver chloride are {111} tabular grains accounting for at least 50% of the total projective area, more preferably 70% and still more preferably 90% of all grains, having at least 90 mole % of silver chloride and not more than 1 mole % of silver iodide. Preparation methods of emulsions having such grains can be found in EP-A's 0 494 376, 0 576 064, 0 584 816, 0 577 173, 0 584 811, 0694 810, 0 694 809, 0 732 617, 0 731 379, 0 809 135 and in EP-A 0 866 362, in EP-Applications Nos. 97203313, filed Oct. 24, 1997 and 98200236, filed Jan. 27, 1998 and 98200236, filed Jan. 27, 1998; in U.S. Pat. Nos. 5,389,509; 5,399,477; 5,698,387 and in Research Disclosure No. 161 (1977), p.84–87.

In another embodiment according to the method of the present invention the said tabular grains rich in silver chloride are {100} tabular grains accounting for at least 30% and more preferably at least 50% of the total projective area of all grains, having at least 90 mole % of silver chloride and not more than 1 mole % of silver iodide. Preparation methods of emulsions having such grains can be found in EP-A's 0 534 395, 0 653 669, 0 584 815, 0 584 644, 0 617 317, 0 617 321, 0 645 670, 0 672 940, 0 670 515, 0 670 514, 0 767 400, 0 768 567, 0 843 207, in EP-Application Nos. 97203311, filed Oct. 24, 1997 and 98201093, filed Apr. 7, 1998; in U.S. Pat. Nos. 5,292,632; 5,320,938; 5,356,764; 5,558,982; 5,565,315; 5,641,620; 5,663,041 and in Research Disclosure No. 394 (1997), p.83–89.

In still another embodiment according to the method of the present invention the said grains rich in silver chloride are cubic grains having at least 90 mole % of silver chloride and not more than 1 mole % of silver iodide. Preparation methods of emulsions having such grains can be found in U.S. Pat. Nos. 5,397,687 and 5,543,284.

In silver chloride, silver chlorobromide, silver chlorobromoiodide or silver chloroiodide emulsion crystals comprising iodide in an amount of from 0.1 mole % up to at most 1 mole % if iodide is present, the halide distribution in the tabular grains can be homogenous over the whole crystal volume. When phases differing in silver halide composition are present over the crystal volume said crystal is said to have a core-shell structure. More than one shell can be present and between different phases it may be recommended to have a phase enriched in silver iodide by applying the so-called conversion technique during preparation. Iodide ions can be provided by using aqueous solutions of inorganic salts thereof as e.g. potassium iodide, sodium iodide or ammonium iodide. Iodide ions can also be provided by organic compounds releasing iodide ions as has e.g. been described in EP-A's 0 561 415, 0 563 701, 0 563 708, 0 649 052 and 0 651 284 and in WO 96/13759. Especially in order to obtain a more homogeneous iodide distribution in the crystal lattice and over the whole crystal population iodide ions provided by organic agents releasing iodide ions are preferred such as mono iodide acetic acid, mono iodide propionic acid, mono iodide ethanol and even hydrogels containing iodide ions, capable to generate iodide ions.

Another way to provide the same result has been described in U.S. Pat. Nos. 5,248,587; 5,318,887 and 5,420,007 wherein use has been made of very fine silver iodide emulsion crystals having an average diameter of about 0.050 $\mu$m or even less (so-called Lippmann emulsions).

Although preferred with respect to intrinsic and to spectral sensitivity it is recommended to limit average iodide concentrations to up to 1 mole %, more preferably to 0.5 mole %, and still more preferably from 0.1 to 0.3 mole % based on the total silver amount as higher concentrations retard development and lead to unsatisfactory sensitivities. Moreover the velocity of fixation can be disturbed in that case and as a consequence residual coloration may be unavoidable.

Bromide ion concentrations of up to at most 25 mole % based on the total silver amounts are contemplated in silver chloride crystals comprising limited amounts of silver bromide, but in order to avoid a strong inhibition of the processing, the silver chlorobromoiodide emulsion crystals used according to the method of the present invention preferably have an amount of silver bromide of at most 10 mole % and more preferably even lower. So in order to reduce the amount of replenisher in the processing, it is even more preferable to reduce the amount of bromide ions to less then 5 mole %. Bromide ions can be provided from at least one inorganic and/or organic agent providing bromide ions.

Emulsions comprising silver chlorobromoiodide or chloroiodide crystals may be built up so that an amount of 20 to 100 mole %, and even an amount of 50 to 100 mole % of the total amount of iodide ions is located at the surface of the said emulsion crystals as e.g. in EP-A 0 678 772. Iodide ions can be present in one or more shell regions, in form of zones wherein iodide ions are concentrated locally.

For practical use thin {111} tabular grains accounting for at least 50% of the total projective surface area of all grains, more preferred for at least 70% and still more preferred for at least 90%, may be present, said grains having an average crystal diameter of from 0.3 to 3.0 $\mu$m, more preferred from 0.5 to 2.5 $\mu$m and still more preferred from 0.5 to 1.5 $\mu$m, for an average thickness of the tabular grain from 0.05 up to 0.30 $\mu$m, more preferred from 0.05 to 0.25 $\mu$m and still more preferred from 0.06 to 0.20 $\mu$m. Average aspect ratios of the {111} tabular grains obtained after calculation from the ratio of diameter to thickness measured for each grain can be in the range 2:1 to 100:1, more preferred from 5:1 to 50:1 and still more preferred from 5:1 to 20:1 or even from 8:1 to 20:1.

On the other hand {100} tabular silver halide grains containing at least 50 mole % of silver chloride, wherein at least 30% by number of all grains, more preferably more than 50% and still more preferably more than 70% is provided by said tabular grains, exhibiting an average aspect ratio of at least 5 and an average equivalent circular grain diameter of at least 0.3 $\mu$m, wherein said tabular grains have an average thickness of less than 0.25 $\mu$m.

Cubic grains having a homogeneous crystal size distribution wherein the ratio between the standard deviation from the average crystal size and said average crystal size is not more than 0.20 are preferred for use in the method of the present invention, wherein further average grain diameters of said cubic grains are from 0.1 up to 1.2 $\mu$m, more preferably up to 0.9 $\mu$m and still more preferably up to 0.6 $\mu$m.

Preferred boundary values of grain thicknesses of tabular grains rich in silver chloride mentioned hereinbefore are related with the fact that particularly the requirement of high sensitivity and the particular advantages of spectrally sensitized tabular grains should be combined. Whereas for cubic grains (as well as for {100} tabular grains) spectral sensitization is normally performed after chemically ripening (sensitizing) said grains, it is advantageous for {111} tabular grains to perform spectral sensitization before chemically ripening spectral sensitizers are chosen in amounts and with respect to their structure in order to provide stabilization of the inherent instable {111} flat planes rich in silver chloride by the said spectral sensitizers, discussed hereinafter, which are playing a role as site-directors.

For radiographic applications photographic advantages of tabular grains compared to normal globular grains (as also cubes, wherein the way of processing may be advantageous as illustrated in EP-A 0 709 730) are a high covering power at high forehardening levels, a high developability and higher sharpness thanks to a reduced degree of cross-over, especially in double side coated spectrally sensitized materials. The thinner the tabular grains the greater these advantages: preferred are therefore thicknesses of less than 0.20 $\mu$m and more preferred from 0.05 up to 0.15 $\mu$m.

Grains rich in chloride may further be doped with whatever a dope as e.g. with group VIII metal ions like $Rh^{3+}$, $Ir^{4+}$, $Ru^{2+}$, and $Co^{2+}$ or with $Cd^{2+}$, $Zn^{2+}$ or $Pb^{2+}$ or even with a mixture thereof. Other suitable dopants used during precipitation or chemical ripening of the silver chlor(iod)ide or silver chlorobrom(oiod)ide emulsion crystals may be e.g. Fe, Ni, Ru, Rh, Pd, Os, Pt, Hg, Tl and Au. Most preferred are ruthenium, rhodium and iridium. Combinations of one or more dopant(s) may be added, in the same or different preparation steps of silver halide crystals rich in silver chloride having a tabular crystal habit. Just as halide ions the said dopants can be divided homogeneously or heterogeneously over the total crystal volume. So in the core or in the shell or even at the crystal surface, as is e.g. the case when conversion techniques are applied, the said halide ions and/or the said dopants may be concentrated.

An important factor influencing growth of silver nuclei in the preparation of silver halide grains rich in chloride, is the choice of and the amount of protective colloid present in the reaction vessel or added simultaneously with one of the solutions added thereto during nucleation and further, eventually, after nucleation, during physical ripening before and/or during growth of the nuclei formed. The most well-known and practically used hydrophilic colloidal binder during precipitation of silver halide crystals rich in silver chloride is gelatin. Gelatin may, however, be replaced in part or integrally by synthetic, semi-synthetic, or natural polymers. Synthetic substitutes for gelatin are e.g. polyvinyl alcohol, poly-N-vinyl pyrrolidone, polyvinyl imidazole, polyvinyl pyrazole, polyacrylamide, polyacrylic acid, and derivatives thereof, in particular copolymers thereof. Natural substitutes for gelatin are e.g. other proteins such as zein, albumin and casein, cellulose, saccharides, starch, and alginates. In general, the semi-synthetic substitutes for gelatin are modified natural products e.g. gelatin derivatives obtained by conversion of gelatin with alkylating or acylating agents, by grafting of polymerizable monomers on gelatin or prehardened gelatins with blocked functional groups as a consequence of this prehardening treatment, cellulose derivatives such as hydroxyalkyl cellulose, carboxymethyl cellulose, phthaloyl cellulose, and cellulose sulphates and even potato starch, whether or not pre sent in cationic and/or oxidized form.

Further synthetic high molecular compounds described in JP-B-52-16365, Journal of The Society of Photographic Science and Technology of Japan, Vol. 29(1), 17, 22(1966), ibid., Vol. 30(1), 10, 19(1967), ibid., Vol. 30(2), 17(1967), and ibid., Vol. 33(3), 24(1967) may be used as a dispersion medium. Also the crystal habit restraining agent described in EP-A 0 534 395 may be used.

Part of gelatin may further be replaced with a synthetic or natural high-molecular material.

In the nucleation step of the preparation of emulsion crystals rich in silver chloride used in the method of the present invention, gelatin having a lower methionine content is often used. The most preferred gelatin used has a methionine content of from 1 to 60 $\mu$mole/g depending on each specific case. More preferably gelatin having a methionine content of from 1 to 50 $\mu$mole/g, and still more preferably amounts from 1 to 30 $\mu$mole/g (4400 p.p.m.) may be preferably used: according to U.S. Pat. No. 4,713,323 (in the context of the preparation of {111} tabular grains), oxidized gelatin is defined as a gelatin having a methionine content of less than 30 $\mu$mole/g.

Another factor which may be important in the nucleation and/or grain growth mechanism is the calcium content of gelatin used as a colloidal binder. In most commercial high-quality inert gelatins the calcium content is about 0.4%, which corresponds with about 100 mmole/kg, measured at the end of the preparation process of inert gelatin. Complex-bound calcium ions strongly decrease the electric potential carried by gelatin. Substantially "calcium free gelatin" is thus defined as gelatin with a calcium content at a level below 40 ppm which corresponds with the analytical detection limit. Use thereof in the preparation of {100} tabular grains rich in silver chloride is therefore highly preferred as has been illustrated (in combination with oxidized gelatin) in EP-A 0 843 207.

In a preferred mode the precipitation reaction of silver chloride, silver chlorobromoiodide and/or silver chloroiodide emulsion crystals proceeds in a dispersing medium wherein the ratio by weight of gelatin to an equivalent amount of silver nitrate is up to 0.35, unless e.g. colloidal silica is used in order to replace gelatin partially or totally. It is clear that this condition will be not fullfilled either when use is made in the reaction vessel, in part or integrally of a non-aqueous medium, of a non-aqeous solvent instead of water, as has been disclosed e.g. in U.S. Pat. Nos. 5,478,718 and 5,541,051.

At the end of the precipitation, following all possible physical ripening steps, the emulsion mixture is normally cooled to about 40° C., before or after adding a flocculate being a polymeric compound as e.g. polystyrene sulphonic acid, providing as a anionic polymer a behaviour depending on pH. Under carefully controlled conditions of addition and stirring rate the pH of the said dispersing medium is adjusted with an acid to a value in order to get a qualitatively good flocculate. Said flocculate may become decanted and washed with demineralized water in order to remove the soluble salts and the development inhibiting crystal habit modifier, as e.g. adenine, to an allowable residual amount (preferably at most 0.3 mg/g of gelatin) or applying an ultrafiltration washing procedure as disclosed e.g. in Research Disclosure, Vol. 102, October 1972, Item 10208, Research Disclosure Vol. 131, March, Item 13122 and Mignot U.S. Pat. No. 4,334,012.

Said ultrafiltration technique may be applied on-line during the whole precipitation, in order to reduce the increasing amount of water, thus avoiding dilution of the reaction vessel and increasing amounts of soluble salts like the mainly occurring potassium nitrate. Examples thereof have been described e.g. in EP-A 0 577 886. When the emulsion after precipitation is washed by diafiltration by means of a semipermeable membrane, a technique also called ultrafiltration, it is not necessary to use polymeric flocculating agents that may disturb the coating composition stability before, during or after the coating procedure. Such procedures are disclosed e.g. in Research Disclosure Vol. 102, October 1972, Item 10208, Research Disclosure Vol. 131, March, Item 13122 and U.S. Pat. No. 4,334,012. Preferably, at the start of the ultrafiltration, there is no pH or pAg adjustment as pH and pAg are the same as at the end of the preceding precipitation without any adjustment step. Moreover ultrafiltration may be proceeded in order to get the desired pH and pAg values, required when performing further treatment steps as e.g. addition to coating solutions. Any washing step may further be performed by means of halide containing water, preferably water containing chloride ions.

Redispersion, if required, may further be performed by addition of extra hydrophilic colloid. As a consequence values of gesi and/or sisi (defined as ratio by weight of silica (if present) to silver, said silver being expressed as equivalent amount of silver nitrate) may be enhanced up to values desired in order to prepare stable coating solutions as will be clear from the description following hereinafter. It is clear however that any useful protective colloid cited hereinbefore as an alternative of gelatin or gelatin in modified form may be used.

As already set forth above adsorption (especially at tabular grains) of one or more spectral sensitizer(s) and an improved light absorption is obtained as the quantum efficiency detected in the photochemical processes is increased.

Easy spectral sensitization, especially at large crystal surfaces may be expected due to the formation of e.g. J-aggregates, and/or to the addition of higher amounts of spectral sensitizer(s): due to the presence of an enhanced specific surface of the tabular crystals this results in better photographic characteristics. Useful methine dyes such as those described by F. M. Hamer in "The Cyanine Dyes and Related Compounds", 1964, John Wiley & Sons include cyanine dyes, merocyanine dyes, complex cyanine dyes, complex merocyanine dyes, holopolar cyanine dyes, hemicyanine dyes, styryl dyes and hemioxonol dyes. Particularly valuable dyes are those belonging to the cyanine dyes, merocyanine dyes, complex merocyanine dyes. Examples of selected useful green light absorbing spectral sensitizers are e.g. anhydro-5,5'-dichloro-3,3'-bis(n-sulphobutyl)-9-ethyloxacarbocyanine hydroxide or anhydro-5,5'-dichloro-3,3'-bis(n-sulphopropyl)-9-ethyl-oxacarbocyanine hydroxide. A suitable mixture of spectral sensitizers that is applied is anhydro-5,5'-dichloro-3,3'-bis(n-sulphobutyl)-9-ethyl oxacarbocyanine hydroxide or anhydro-5,5'-dichloro-3,3'-bis(n-sulphopropyl)-9-ethyloxacarbocyanine hydroxide together with anhydro-5,5'-dicyano-1,1'-diethyl-3,3'-di(2-acetoxy-ethyl)ethyl-imidacarbocyanine bromide. Specific combinations of imidacarbocyanines and oxacarbocyanines as spectral sensitizers added to emulsions prior to chemical sensitization have been described in EP-A's 0 608 955 and 0 658 805. Unsymmetrically chain substituted oxacarbocyanine dyes and/or imidacarbocyanine dyes to improve e.g. dye stain after processing and spectral sensitivity in the green short wavelength region can also be used as has been given in JP-A 03–048235. Supersensitization with a symmetrical oxacarbocyanine dye in combination with a carbocyanine dye of e.g. the oxazole-imidazole type can be useful as has been disclosed in U.S. Pat. Nos. 4,594,317 and 4,659,654. Specifically spectral sensitization of tabular grains with N-fluoro-alkyl substituted imidacarbocyanine dyes is useful as has been described in U.S. Pat. No. 4,675,279. According to the method of the present invention use of spectral sensitizers as described in EP-Application No. 98200061, filed Jan. 13, 1998 is highly preferred.

Dyes absorbing in the blue wavelength region of the visible spectrum for use as spectral sensitizers for cubic and/or tabular silver halide grains rich in chloride have been described in JP-A 01–196031 and in U.S. Pat. Nos. 4,494,212; 4,952,491 and 5,376,523. As is well-known and as has been described in U.S. Pat. Nos. 5,108,887 and 5,376,523 and in EP-A's 0 622 665 and 0 712 034, zeromethine dyes are very useful in the said wavelength region. In the method according to the present invention spectral sensitization EP-Application No. 97202169, filed Jul. 11, 1997 can advantageously be applied.

As already set forth combinations of differing spectral sensitizers may be used as well as mixtures of emulsions being the same or different, wherein each part may be spectrally sensitized with another spectral sensitizer or with another combination of spectral sensitizers. Spectral sensitizers having asymmetrical heterocycles may be useful with respect to improvements in residual coloration after processing. other dyes, which do not have any spectral sensitization activity, or certain other compounds, which do not substantially absorb visible radiation, may have a supersensitization effect when they are incorporated together with said spectral sensitizing agents into the emulsion. Suitable supersensitizers are e.g. heterocyclic mercapto compounds containing at least one electronegative substituent as described e.g. in U.S. Pat. No. 3,457,078, nitrogen-containing heterocyclic ring-substituted aminostilbene compounds as described e.g. in U.S. Pat. No. 2,933,390 and U.S. Pat. No. 3,635,721, aromatic organic acid/formaldehyde condensation products as described e.g. in U.S. Pat. No. 3,743,510, cadmium salts, and azaindene compounds.

As has already set forth it is highly contemplated that spectral sensitization can occur simultaneously with or even precede completely the chemical sensitization step. Before starting chemical sensitization the surface of the silver halide grains rich in chloride may be treated with slightly oxidizing compounds as e.g. toluene thiosulphonic acid and/or corresponding salts thereof in order to reduce small silver specks to grow to fog centers in an uncontrolled manner. To silver halide grains rich in chloride chemically sensitizing compounds can be added as described e.g. in "Chimie et Physique Photographique" by P. Glafkides, in "Photographic Emulsion Chemistry" by G. F. Duffin, in "Making and Coating Photographic Emulsion" by V. L. Zelikman et al, and in "Die Grundlagen der Photographischen Prozesse mit Silberhalogeniden" edited by H. Frieser and published by Akademische Verlagsgesell-schaft (1968). As described in said literature chemical sensitization can be carried out by effecting the ripening in the presence of small amounts of compounds containing sulphur e.g. thiosulphate, thiocyanate, thioureas; selenium e.g. selenosulphate, selenocyanate, selenoureas; tellurium e.g. tellurosulphate, tellurocyanate, telluroureas; sulphites, mercapto compounds, rhodamines etc. The emulsions can be sensitized also by means of gold-sulphur ripeners, gold-selenium ripeners, gold-sulphur-selenium ripeners, or by means of reductors e.g. tin compounds as described in GB 789,823, amines, hydrazine derivatives, formamidine-sulphinic acids, and silane compounds although care should be taken in order to prevent the emulsion from fog formation in an uncontrollable way. In a preferred embodiment according to the method of the present invention emulsion grains rich in chloride are chemically ripened with agents providing sulphur, selenium and gold ions. Normal amounts of gold compounds (as gold chloride or gold thiocyanate) are in the range from $1\times10^{-5}$ to $2.5\times10^{5-}$ moles per mole of silver halide.

As has already been suggested hereinbefore the use of reducing agents in the chemical ripening of silver halide emulsion crystals rich in chloride is not preferred, but not excluded either as depending upon the circumstances it may be recommended to use small amounts in order to counterbalance the restraining actions from spectral sensitizers, fog-restrainers or stabilizers as e.g. substituted heterocyclic mercaptocompounds described in U.S. Pat. No. 5,242,791. Silver solvents may have a regulating role therein as e.g. thiocyanate ions.

The silver halide photographic emulsions being used in the processing method of the present invention can further contain various kinds of compounds in addition to the silver halide adsorptive materials in the chemical sensitization step in the present invention for preventing the occurrence of fog in the production steps, the storage and photographic processing of the photographic materials or stabilizing the photographic performance of the photographic materials.

For example, the silver halide photographic emulsions can contain any of the compounds known as antifoggants or stabilizers such as azoles (e.g., benzothiazolium salts, nitroimidazoles, nitrobenzimidazoles, chlorobenzimidazoles, bromobenzimidazoles, nitroindazoles, benzotriazoles, and aminotriazoles); mercapto compounds (e.g., mercaptothiazoles, mercaptobenzothiazoles, mercaptobenzimidazoles, mercaptothiazoles, mercaptotetrazoles, mercaptopyrimidines, and mercaptotrizines); thioketo compounds (e.g., oxadolinethione); azaindenes (e.g., triazaindenes, tetraazaindenes,in particular, 4-hydroxy-substituted (1,3,3,a,7)tetraazaindenes), and pentaazaindenes; benzenethiosulfonic acid; benzenesulfinic acid; benzenesulfonic acid amide, etc.

In particular, the mercapto compounds described in JP-A 60-80839, the heterocyclic compounds described in JP-A-57-164735, and the complex salts of heterocyclic compounds and silver (as e.g. 1-phenyl-5-mercaptotetrazole silver), etc., can preferably be used. Also, even when a sensitizing dye is used as silver halide adsorptive material in the chemical sensitization step, if necessary, a spectral sensitizing dye for other wavelength region may be added to the emulsion. Therefore compounds preventing the formation of fog or stabilizing the photographic characteristics during the production or storage of the photographic elements or during the photographic treatment thereof are required and are in most cases already present during emulsion precipitation and/or (spectral and/or chemical) sensitization. Many known compounds can be added as fog-inhibiting agent or stabilizer to the silver halide emulsion layer or to other coating layers in water-permeable relationship therewith such as an undercoat or a protective layer. Suitable examples have been described in Research Disclosure No 17643 (1978), Chapter VI and in RD's Nos. 36544 (1994) and 38957 (1996), Chapter VII.

The photographic element may further comprise various kinds of coating physical property modifying addenda as described in RD's Nos. 36544 (1994) and 38957 (1996), Chapter IX, wherein coating aids, plasticizers and lubricants, antistats and matting agents have been described. Development acceleration can be accomplished for materials which are processed according to the method of the present invention by incorporating in emulsion layer(s) or adjacent layers various compounds, preferably polyalkylene derivatives having a molecular weight of at least 400 such as those described in e.g. U.S. Pat. Nos. 3,038,805; 4,038,075 and 4,292,400 as well as in EP-A's 0 634 688 and 0 674 215.

The photographic element may further comprise various other additives such as e.g. compounds improving the dimensional stability of the photographic element, ultraviolet absorbers and spacing agents. Suitable ultraviolet absorbers have e.g. been described in RD's Nos 36544 (1994) and 38957 (1996), Chapter VI, wherein also suitable optical brighteners are mentioned. Spacing agents may be present of which, in general, the average particle size is comprised between 0.2 and 10 $\mu$m. Spacing agents can be soluble or insoluble in alkali. Alkali-insoluble spacing agents usually remain permanently in the photographic element, whereas alkali-soluble spacing agents usually are removed therefrom in an alkaline processing bath. Suitable spacing agents can be made e.g. of polymethyl methacrylate, of copolymers of acrylic acid and methyl methacrylate, and of hydroxypropylmethyl cellulose hexahydrophthalate. Other suitable spacing agents have been described in U.S. Pat. No. 4,614,708.

As already set forth additional gelatin or another hydrophilic colloid, suitable as a binder material can be added at a later stage of the emulsion preparation e.g. after washing, in order to establish optimal coating conditions and/or in order to establish the required thickness of the coated emulsion layer. Preferably a gelatin to silver halide ratio, silver halide being expressed as the equivalent amount of silver nitrate, ranging from 0.3 to 1.0 is then obtained. Another binder may also be added instead of or in addition to gelatin. Useful vehicles, vehicle extenders, vehicle-like addenda and vehicle related addenda have been described e.g. in Research Disclosures Nos 36544 (1994) and 38957 (1996), Chapter II.

Prior to coating any thickening agent may be used in order to regulate the viscosity of the coating solution, provided that they do not particularly affect the photographic characteristics of the silver halide light-sensitive photographic material. Preferred thickening agents include aqueous polymers such as polystyrene sulphonic acid, dextran, sulphuric acid esters, polysaccharides, polymers having a sulphonic acid group, a carboxylic acid group or a phosphoric acid group as well as colloidal silica.

Polymeric thickeners well-known from the literature resulting in thickening of the coating solution may even be used in combination with colloidal silica. Patents concerning thickening agents are e.g. U.S. Pat. No. 3,167,410; Belgian Patent No. 558.143 and JP-A's 53-18687 and 58-36768. Negative effects on physical stability possibly resulting from the addition of polymeric compounds can be avoided by exclusion of those compounds and by restricting extra additions of colloidal silica. In order to coat hydrophilic colloidal layer compositions on a support by slide-hopper or curtain-coating techniques, wherein said compositions have gelatin in low amounts in order to provide a ratio by weight of gelatin to silver halide expressed as an equivalent amount of silver nitrate in the range from 0.05 to 0.4, thickening agents composed of synthetic clay and anionic macromolecular polyelectrolytes wherein said synthetic clay is present in an amount of at least 85% by weight versus the total amount of thickening agents are recommended as has been disclosed in EP-A 0 813 105.

With respect to the ability of coating of extremely thin hydrophilic layers a light-sensitive silver halide photographic material is disclosed in EP-A 0 831 362, wherein said material comprises a support and one or more hydrophilic colloidal silver halide emulsion layers having silver halide crystals with colloidal silica as a protective colloid the said layer(s) having a gesi, defined as ratio by weight of gelatin to silver, in the range from 0 to less than 0.05 and a sisi, defined as ratio by weight of silica to silver, in the range from 0.01 to less than 0.10, wherein said weight of silver in the calculation of gesi and sisi is expressed as an equivalent amount of silver nitrate. Photographic material having thin emulsion layers e.g. layers with a layer thickness of less than 5 $\mu$m, containing less than 5 g of gelatin, preferably about 3 g/m$^2$ and more preferably about 2 g/m$^2$ offer the advantage that besides rapid processing applicability and the rapid drying of the wet processed material an improvement in sharpness is observed.

Besides the light-sensitive emulsion layer(s) the black-and-white photographic material may contain several light-insensitive layers at the side of the support carrying said light-sensitive emulsion layer(s), e.g. a protective antistress layer which can be split up into two layers, one of them being an underlying interlayer or an outermost afterlayer coated or sprayed on top of the "basic" protective antistress layer. Said protective antistress layer may comprise e.g. one or more organic compounds inhibiting development, like e.g. organic compounds inhibiting development is(are) preferably (a) benzotriazole compound(s) as disclosed in EP-A 0 866 362. When the developer is free from sulphite ions, said sulphite ions when replaced by anti-oxidants as e.g. 1-ascorbic acid, reductic acid, erythorbic acid, iso-ascorbic acid, derivatives thereof and/or salts thereof, then a low-sludge developer is provided as disclosed therein. Said anti-oxidants, if moreover replacing common developing agents as e.g. hydroquinone lead to a particularly useful ecologically justified low-sludge developer. Protective antistress layers present in the materials used in the method of the present invention preferably contain coating aids and coating physical property modifying addenda mentioned in RD's Nos. 36544 and 38957, published September 1994 and 1996 respectively, Chapter IX. Antistatic properties are especially preferred in order to prevent blackening after processing in form of sparks etc. due to abrupt decharging of electrostatic charges during production and/or handling before exposure and/or processing. It is highly preferred to add antistatic agents to the protective antistress layer or to an afterlayer coated thereupon as has been described e.g. in EP-A's 0 534 006, 0 644 454 and 0 644 456 and in U.S. Pat. Nos. 4,670,374 and 4,670,376. Abrasion resistance of these outermost layers may be improved as described in U.S. Pat. Nos. 4,766,059 and 4,820,615. Spraycoating of afterlayers has been disclosed e.g. in U.S. Pat. No. 5,443,640. Non-imagewise blackening may alternatively be due to pressure sensitivity of the silver halide grains rich in chloride. Measures in order to prevent pressure sensitivity may be coating of enhanced amounts of binder as e.g. gelatin. This however is disadvantageous with respect to rapid processing and therefore as an alternative silver halide crystals rich in chloride prepared in silica may offer an alternative as has been disclosed e.g. in EP-A 0 528 476. Moreover with respect to the binder material in the light-sensitve emulsion layer an improvement of pressure sensitivity can be expected if use is made therein from synthetic clays as has been disclosed in U.S. Pat. No. 5,478,709. As an alternative zeolites may be used. In the presence however of spectral sensitized emulsion crystals in the said light-sensitive layers care should be taken in order to select suitable synthetic clays as has been disclosed in EP-A 0 757 285.

When in the fixing step the fixer solution is free from aluminum ions, it is clear that the light-sensitive black-and-white silver halide photographic materials processed according to the method of the present invention should be hardened to such an extent that in a fixation step free from aluminum ions no problems as e.g. sludge formation or troubles with physical properties of the materials occur. A survey of hardening agents available in order to foreharden coated hydrophilic gelatinous layers of the said photographic materials has been given e.g. in Research Disclosure 38957, Chapter IIb. As an alternative aluminum salt solutions as e.g. aluminum sulphate may be spray-coated onto or coated in an afterlayer onto the protective antistress layer or another outermost layer of the photographic material, in favour of hardening of the surface layer and in favour of physical properties obtained for the processed material after fixation in a fixer free from hardening aluminum ions, especially with respect to surface glare, pressure sensitivity and unevenness in the processing.

Besides the protective antistress layer(s) and optional afterlayer(s) as other non-light-sensitive layers one or more subbing layers, one or more intermediate layers e.g. filter layers, antistatic agent(s), filter dyes for safety-light purposes etc. may be present.

Intermediate layers eventually containing filter or antihalation dyes that absorb scattering light and thus promote the image sharpness have been described in e.g. U.S. Pat. Nos. 4,092,168; 4,311,787; 5,344,749; 5,380,634; 5,474,881; 5,478,708; 5,502,205; in EP-A's 0 489 973 and 0 586 748 and in EP-A's 0 786 497 and 0 781 816; in DE 2,453,217, and in GB-A 7,907,440. Situated in such an intermediate layer between the emulsion layers and the support there will be only a small negligable loss in sensitivity but rapid processing conditions, although said dyes decolorize very rapidly in alkaline solutions, require minimization of the thickness of the whole coated layer, an item which has already been discussed hereinbefore: multilayer arrangements of thin layers clearly result in shorter drying times after washing in the processing cycle. It is further in favour of decolorizing properties to have said suitable dyes in form of finely dispersed form and more preferred in solid particle dispersed form. Evidence therefore is specifically given in EP-A 0 724 191 and in a more general way in EP-A 0 756 201.

In addition thereto it is recommended to prepare aqueous solid dispersions in colloidal silica for any photographically useful compound as has been described e.g. in EP-A 0 569 074. Advantages with respect to thin layer coating and rapid processing ability can be expected, without enhancing pressure sensitivity of more vulnerable layers.

Backing layers applied to a material having at least one emulsion layer at one side of a light-sensitive silver halide material having emulsion crystals rich in chloride used in the image-forming systems essentially contain as ingredients hydrophilic colloids, one or more antihalation dye(s), matting agent(s), surfactant(s), antistatic agent(s), lubricant(s) and hardening agent(s), said ingredients being same as discussed hereinbefore.

Amounts of hydrophilic colloids may be chosen in order to prevent curl of the single side emulsion coated material, such as in U.S. Pat. No. 5,155,013. Also non-swelling hydrophobic polymers can be used in the backing layer as has e.g. been described in U.S. Pat. No. 5,326,686. Further measures to prevent curling have been disclosed e.g. in JP-A's 02-24645; 02-85847 and 02-87138.

The support of the black-and-white photographic materials comprising silver halide emulsion having crystals rich in chloride, used for X-ray imaging, may be a transparent resin, preferably a blue colored polyester support like polyethylene terephthalate. The thickness of such organic resin film is preferably about 175 $\mu$m. Other hydrophobic resin supports are well known to those skilled in the art and are made e.g. of polystyrene, polyvinyl chloride, polycarbonate and polyethylene naphthalate. The support is further provided with a substrate layer at both sides to have good adhesion properties between the adjacent layers and said support: one or more subbing layers known to those skilled in the art for adhering thereto a hydrophilic colloid layer may be present. Suitable subbing layers for polyethylene terephthalate supports are described e.g. in U.S. Pat. Nos. 3,397,988, 3,649, 336, 4,123,278 and 4,478,907. A preferred layer arrangement wherein a subbing layer composition comprising as a latex copolymer vinylidene chloride, methylacrylate and itaconic acid has been covered with hydrophilic layers being at least one gelatinous dye containing layer comprising one or more dyes, at least one silver halide emulsion layer, at least one protective antistress layer, and optionally an afterlayer has been described in EP-A 0 752 617. In that invention said hydrophilic layers have a swelling ratio of not more than 200% and in said hydrophilic layers are coated simultaneously by the slide-hopper coating or by the slide-hopper curtain coating technique. Further information on suitable supports can be found in RD's Nos. 36544 and 38957, Chapter XV, published September 1994 and September 1996 respectively.

The silver halide grains or the silver halide emulsions in the present invention can be used for conventionally known all black-and-white photographic materials such as, for example, X-ray photographic materials, photographic materials for printing, photographic papers, photographic negative films, microfilms, direct positive photographic materials, super fine grain light-sensitive materials (for a LSI photomask, for a shadow mask, for a liquid crystal mask, for diffusion transfer type materials, for heat-developable photographic materials, for high-density digital recording photographic materials, photographic materials for holography, etc.

In a preferred embodiment black-and-white silver halide photographic materials comprising grains rich in chloride to be processed according to the method of the present invention are (single-side or double-side coated) radiographic materials or (single-side coated) laser-imaging materials wherein a laser source directed by digital information is "written" on a hard-copy laser film. Suitable lasers may be gas lasers or solid state lasers. As a suitable gas laser a helium/neon gas laser is well-known (absorption maximum 633 nm). As a solid state laser an infrared laser diode having a more bathochrome absorption maximum at 820 nm may be used, but nowadays also green- and blue-light laser sources are available, as e.g. a YAG-laser. As a preferred laser imager we refer to the laser imager MATRIX LR 3300, trade name product marketed by Agfa-Gevaert.

Single-side coated materials have e.g. been described in U.S. Pat. No. 5,449,599, in EP-A's 0 610 608, 0 712 036 and 0 794.456. Double-side coated materials have e.g. been described in U.S. Pat. Nos. 5,397,687 and 5,660,966 and in EP-A's 0 678 772 and 0 754 972.

In radiography the interior of objects is reproduced by means of penetrating radiation which is high energy radiation belonging to the class of X-rays, γ-rays and high energy elementary particle radiation, e.g. β-rays, electron beam or neutron radiation. For the conversion of penetrating radiation into visible light and/or ultraviolet radiation luminescent substances are used called phosphors. Light emitted imagewise by intensifying screens as in medical diagnosis irradiates a contacting photographic silver halide emulsion layer film which after exposure is developed to form therein a silver image in conformity with the X-ray image.

More specifically for use in common medical radiography the X-ray film comprises a transparent film support double-side coated with a silver halide emulsion layer. During the X-ray irradiation said film is arranged in a cassette between two X-ray conversion screens each of them making contact with their corresponding silver halide emulsion layer. Phosphors suitable for use in the conventional radiographic system must have a high prompt emission on X-ray irradiation and low after-glow in favour of image-sharpness.

An improved set of blue-light-emitting screens has e.g. been described in U.S. Pat. No. 5,381,015. Specific intensifying screens emitting ultraviolet-blue radiation have further been disclosed in U.S. Pat. Nos. 4,225,653; 4,387,141; 4,710,637; 5,112,700; 5,173,611 and 5,432,351; in EP-A's 0 650 089; 0 658 613; in WO93011457 and WO95015514.

Typical blue-UV emitting phosphors are tantalates and hafnates and fluorohalides of barium and strontium. In EP-A 0 820 069, particles a niobium doped, monoclinic M, yttriumtantalate phosphor and particles of an europium doped bariumfluorohalide phosphor are composing the screen.

Specific intensifying screens emitting green light radiation have been disclosed in GB 1 489 398; in U.S. Pat. Nos. 4,431,922 and 4,710,637. A typical green emitting phosphor used therein is a gadolinium oxisulphide phosphor.

Screen-film systems wherein blue and/or (ultra)violet radiation emitted by screens is absorbed by suitable films in contact therewith have been described e.g. in EP-A 0 712 034 and in EP-Application 97202169, filed Jul. 11, 1997, and in WO93001521. In the said WO a double-side coated element is disclosed containing at least 50% of tabular grains having at least 50 mole % of chloride.

Screen-film systems wherein green-light emitting screens are used in contact with green sensitized silver halide films have been described e.g. in EP-A 0 678 772.

Screen/film combinations may be symmetric or asymmetric: this means that screens differing in speed and/or radiation emitted therefrom are differing and/or that there is a difference in speed and/or contrast and/or spectral sensitivity at both sides of the film support.

Although it is possible to use whatever a processing unit adapted to the requirements described hereinbefore to reach the objectives concerning a perfect link between rapid processing and ecology, the objects of this invention concerning processing have e.g. been realized in the processing unit CURIX HT 330, trade name product marketed by Agfa-Gevaert.

New developments however become available with respect to processing apparatus. In a conventional processing apparatus the sheet material is transported along a generally horizontal feed path, the sheet material passing from one vessel to another usually via a circuitous feed path passing under the surface of each treatment liquid and over dividing walls between the vessels. However, processing machines having a substantially vertical orientation have also been proposed, in which a plurality of vessels are mounted one above the other, each vessel having an opening at the top acting as a sheet material inlet and an opening at the bottom acting as a sheet material outlet or vice versa. In the present context, the term "substantially vertical" is intended to mean that the sheet material moves along a path from the inlet to the outlet which is either exactly vertical, or which has a vertical component greater than any horizontal component. The use of a vertical orientation for the apparatus leads to a number of advantages. In particular the apparatus occupies only a fraction of the floor space which is occupied by a conventional horizontal arrangement. Furthermore, the sheet transport path in a vertically oriented apparatus may be substantially straight, in contrast to the circuitous feed path which is usual in a horizontally oriented apparatus. The straight path is independent of the stiffness of the sheet material and reduces the risk of scratching compared with a horizontally oriented apparatus. In a vertically oriented apparatus, it is important to avoid, or at least minimize leakage of treatment liquid from one vessel to another and carry-over as the sheet material passes through the apparatus. Furthermore it is desirable that the treatment liquid in one vessel is not contaminated by contents of the adjacent vessels, that is neither by the treatment liquid of the next higher vessel nor by vapours escaping from the next lower vessel. In order to reduce consumption of treatment liquids, it is furthermore desirable to reduce the evaporation, oxidation and carbonization thereof. A solution therefore has been proposed in U.S. Pat. No. 5,652,939, wherein it has been disclosed that contamination and evaporation, oxidation and carbonization can both be reduced in a simple manner by a particular construction of the apparatus for the processing of photographic sheet material comprising a plurality of cells mounted one above the other in a stack to define a substantially vertical sheet material path through the apparatus, each cell comprising a housing within which is mounted a rotatable roller biased towards a reaction surface to define a roller nip there-between through which the sheet material path extends and associated sealing means serving to provide a gas- and liquid-tight seal between the roller and reaction surface on the one hand and a wall of the housing on the other. According to a first aspect, invention is characterized by means for connecting each cell to adjacent cells in the stack in a closed manner and according to a second aspect, the invention is characterized in that the roller is a drive roller.

Particularly the objectives set forth above may be achieved when the developing cell of the apparatus is a closed cell and the developing liquid contains an ascorbic acid developing agent as has been described in EP-Application No. 96201753, filed Jun. 24, 1996. According to that invention, there is provided a method of processing photographic sheet material by use of an apparatus comprising a plurality of processing cells so arranged to define a sheet material path through the apparatus, at least one of the cells constituting a developing cell containing a developing liquid, characterized in that the developing cell is a closed cell and the developing liquid contains an ascorbic acid developing agent.

With respect to further characteristics of the processing apparatus suitable for use in the processing method of the present invention we refer to EP-A 0 819 992, wherein it was an object to provide an apparatus in which operating components can easily be replaced without the need for substantial re-programming of the CPU (central processing unit).

It is clear that within the scope of the present disclosure any combination of a laser/film or screen(s)/film may be used, wherein said film may comprise {111} and/or {100} tabular and/or cubic silver halide crystals rich in silver chloride provided that with minimum amounts of coated silver a stable or constant sensitometry, even over long working periods with low total amounts of materials to be developed, is attained in rapid ecological processing of the film materials (with e.g. ascorbic acid and/or derivatives thereof as developing agent(s) in a hardener-free developer and an odour-free fixer, optionally free from aluminum ions, thereby reducing sludge; and replenishing amounts for developer and fixer as low as possible) thanks to the particular feature that the said material has a buffering capacity of less than 6 mmole/m$^2$.

So in the method of the present invention said equivalent developer replenisher, having the same composition as the developer, is providing a regeneration or replenishing amount of less than 150 ml/m$^2$ and more preferably of at most 100 ml/m$^2$. In the method according to the present invention said developers (and equivalent developer replenishers) are ascorbic acid type developers according to the formula (I) comprising as a main developing agent

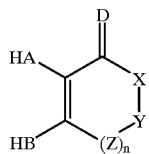

(I)

wherein in the formula (I) each of A, B and D independently represents an oxygen atom or NR$^1$;

X represents an oxygen atom, a sulfur atom, NR$^2$; CR$^3$R$^4$; C=O; C=NR$^5$ or C=S;

Y represents an oxygen atom, a sulfur atom, NR$'^2$; CR$'^3$R$'^4$; C=O; C=NR$'^5$ or C=S;

Z represents an oxygen atom, a sulfur atom, NR$''^2$; CR$''^3$R$''^4$; C=O; C=NR$''^5$ or C=S;

n equals 0, 1 or 2;

each of R$^1$ to R$^5$, R$'^2$ to R$'^5$ and R$''^2$ to R$''^5$ independently represents hydrogen, alkyl, aralkyl, hydroxyalkyl, carboxyalkyl, alkenyl, alkynyl, cycloalkyl, cycloalkenyl, aryl or heterocyclyl; and wherein R$^3$ and R$^4$, R$'^3$ and R$'^4$, R$''^3$ and R$''^4$, may further form a ring together; and wherein in the case that X=CR$^3$R$^4$ and Y=CR$'^3$CR$'^4$, R$^3$ and R$'^3$ and/or R$^4$ and R$'^4$ may form a ring and in the case that Y=CR$'^3$R$'^4$ and Z=CR$''^3$CR$''^4$ with n=1 or 2, R$^3$ and R$'^3$ and/or R$^4$ and R$'^4$ may form a ring.

In a preferred embodiment in the formula (I) A, B and X each represent an oxygen atom; n=0; Y=CH—(CHOH)$_m$—CH$_2$—R$^6$ wherein m=1, 2, 3 or 4 and wherein R$^6$ represents OH for m=1; and H or OH for m=2, 3 or 4. This formula corresponds with (iso)ascorbic acid. As a suitable derivative corresponding to the formula (I), iso-ascorbic acid and 1-ascorbic acid are both preferred.

In another preferred embodiment A and B each represent an oxygen atom; n=O and X and Y each correspond with C(CH$_3$)$_2$. This formula corresponds with tetramethyl reductic acid.

The compound(s) according to the formula (I) preferably is(are) present in the developer solution in an amount comprised between 1 g and 100 g per liter, although a preferred amount of from 20 up to 50 g per liter is sufficient in many cases.

Examples of reducing precursor compounds have, e.g., been described in WO's 94/3834 and 94/16362, which are both incorporated herein by reference.

It is clear that within the context of this invention ascorbic acid is not merely used in the developer as an antioxidant as, e.g., described in WO 93/12463, in JP-A's 4428673 and 55149936, in GB 1,266,533 and in U.S. Pat. Nos. 3,865,591; 4,756,997 and 4,839,259 and in the literature as, e.g., J. Am. Chem. Soc., 60 (1938), p. 99 and p. 2084; 61 (1939), p. 442; 64 (1942), p. 1561, 65 (1943), p. 1489; 66 (1944), p. 700 and 104 (1982), p. 6273.

According to the method of the present invention, said method comprises the step of developing in a developing solution, wherein said solution comprises one or more developing agents. Besides ascorbic acid, reductic acid, stereoisomers or derivatives thereof, normally one or more 1-phenyl-3-pyrazolidine-1-one or 1-phenyl-5-pyrazolidine-1-one, commonly known as "phenidone" compound, is(are) present. A preferred phenidone compound used in the method of the present invention is 4,4'-hydroxymethyl-methyl-3-pyrazolidine-1-one, which is present in amounts of from 0.5 g up to 5 g/liter of developer. Especially if iodide ions are present in the developing solution, said preferred phenidone compound is present in lower amounts as has been disclosed in U.S. Pat. No. 5,296,342.

Developing solutions comprising ascorbic acid and/or derivatives therefrom have e.g. been disclosed in EP-A's 0 731 381, 0 731 382 and 0 732 619.

In a preferred embodiment according to the present invention said developer is substantially free from any polyhydroxybenzene compound, as e.g. hydroquinone, analogues and/or derivatives therefrom.

In another preferred embodiment according to the present invention said developer is substantially free from any hardening agent.

In still another preferred embodiment said developer and/or said fixer solution is(are) free from any boron compound. Although the absence of boron compounds is known to be particularly unfavourable with respect to sludge formation in common processing solutions, its absence is particularly favourable from the point of view of ecology. As a consequence of the use of fixer solutions having a higher pH of at least 4.3, preferably of from 4.6 up to 5.5, more preferably up to 5.3 and still more preferably up to 5.0, the method according to the present invention permits use of lower replenisher amounts. As a result thereof the further advantage of a lower emission level of sulfur dioxide vapours, thus reducing unagreable smell is observed.

In one embodiment of the present invention, the fixer replenisher is preferably supplied at a rate of from 50 ml/m$^2$ up to 300 ml/m$^2$, more preferably at a rate of from 50 ml/m$^2$ up to 150 ml/m$^2$ and still more preferably from 50 ml/m$^2$ up to 100 ml/m$^2$ in running equilibrium conditions. In this case the term "replenishing equilibrium conditions" refers to the condition attained after replacement of a volume equivalent with three times the total tank volume. In another embodiment wherein no replenisher is used as in batch processing, the term "running equilibrium conditions" refers to the moment the processing solution is exhausted, thus requiring exchange of the said processing solution.

The present invention is advantageously applicable to such a reduced replenishment mode, especially when, according to the present invention, pH in the fixer solution in running equilibrium conditions is between a value of from 4.6 up to 7.0 and buffering compounds are present in a concentration of from 0.2 up to 0.8 mole per liter and more preferably in a concentration of from 0.3 up to 0.6 mole per liter. Particularly suitable buffering compounds in the fixer solution are formed by acetic acid and sodium acetate, forming an acetate buffer.

The same applies to the developer solution as in a preferred embodiment according to the present invention pH in said developer solution is buffered between a value of from 9.0 up to 11.0 by buffering compounds having a concentration of from 0.3 up to 1.0 mole/liter and more preferably from 0.3 up to 0.7 mole/liter. Particularly suitable buffering compounds in the developing solution are carbonates as has also been shown in EP-A 0 565 459 wherein the use of ascorbic acid developers with high concentrations of carbonate buffering is illustrated. The high carbonate level provides a high degree of pH buffering and also provides aeration protection via reduced oxygen solubility in the developing solution. Use of highly buffered ascorbic acid developers has been disclosed e.g. in U.S. Pat. No. 5,503,965, wherein the instability of ascorbic acid developers has been tackled not only by the use of highly buffering solutions but in addition by the use of replenisher solutions having a higher pH. The use of developers having a higher buffer capacity however increases the likelihood of aluminum sludging in the fixer, since the pH increase in the fixer solution due to carry-over of alkaline developer will be greater. Therefore in a preferred embodiment according to the method of the present invention a compound having an α-ketocarboxylic acid structure in an amount of not more than 3 g per liter is present in the said fixer solution while starting processing or in the said fixer replenisher.

As previously mentioned, the fixer may contain a water-soluble aluminum salt as a hardener. Examples of aluminum salt hardeners include aluminium chloride, aluminium sulfate and potassium aluminum. The hardener is preferably added in an amount of from 0.01 to 0.2 mole/liter, more preferably 0.03 to 0.08 mole/liter.

In a preferred embodiment the fresh fixer at the start of the processing or the fixer replenisher solution further contains one or more compound(s) having an α-ketocarboxylic acid structure in an amount of not more than 3 g per liter as set forth in EP-Application No. 97203096, filed Oct. 6, 1997. Preferred compounds having such a structure are e.g. oxalic acid, tartaric acid, citric acid, gluconic acid or derivatives thereof in amounts of more than 3 g per liter at the start of the processing.

More preferably the fixer is even free from those compounds at the start of the processing. This should be considered as a further particular advantage offered by the method of the present invention, especially from the viewpoint of cost price of the processing solutions, as even without the presence of those compounds the object of the present invention to avoid sludge formation is fully attainable.

In addition to the above-mentioned components, the fixer contains as preservatives e.g. sulfites and bisulfites, wherein thanks to the preferred pH working range irritating smell or unagreable odour is avoided to a large extent. Further pH adjusting agents as e.g. sulfuric acid and chelating agents are desired.

Subsequent to the developing and fixing steps, the photosensitive material is processed with washing water or with a stabilizing solution which may be replenished at a rate of up to 3 liters per square meter of the photosensitive material (inclusive of 0, indicating batchwise tank water). This enables processing with water savings. Although washing water is commonly used, processing with a stabilizing solution is also acceptable.

Although only one washing tank is used in the illustrated embodiment, any suitable means for reducing the amount of a washing water replenished can be applied to the invention. One such well-known means is a multistage (e.g. two or three stage) counter-flow system. This system accomplishes efficient washing since the photosensitive material after fixation comes into contact with a series of clearer washing water portions, that is, water portions which are less contaminated with the fixer as the photo-sensitive material proceeds forward.

In the case of the washing process with water savings or non-piping washing process, anti-bacterial means is preferably applied to washing water or stabilizing solution. The anti-bacterial means includes irradiation of ultraviolet radiation as disclosed in JP-A 263939 /1985; application of a magnetic field as disclosed in JP-A 263940/1985; blowing of ozone as described in Somiya ed., "Ozone Utilising Treatment", Kogai Taisaku Gijutu Doyukai, 1989, the methods disclosed in Japanese Patent Application Nos. 309915/1989 and 208638/1990, the use of ion-exchange resins to purify water as disclosed in JP-A 131632/1986, and anti-bacterial agents as disclosed in JP-A 115154/1987, 153952/1987, 220951/1987 and 209532/1987. Also useful are anti-fungal agents, anti-bacterial agents and surfactants as described in L. E. West, "Water Quality Criteria", Photo. Sci. & Eng., Vol. 9, No. 6 (1965); M. W. Beach, "Microbiological Growths in Motion-Picture Processing", SMPTE Journal, Vol. 85 (1976); R. O. Deegan, "Photo processing Wash Water Biocides", J. Imaging Tech., 10, No. 6 (1984); and JP-A 8542/1982, 58143/1982, 97530/1982, 132146/1982, 157244/1982, 18631/1983, and 105145/1983.

In the washing and stabilizing baths, there may be added in combination with microbiocides, the isothiazolines described in R. T. Kreiman, J. Image, Tech 10(6), 242 (1984), the isothiazolines described in Research Disclosure, Vol. 205, No. 20526 (May 1981), the isothiazolines described in Research Disclosure, Vol. 228, No. 22845 (April 1983), the compounds described in JP-A 209532/1987, and the silver ion releasing agents described in Japanese Patent Application No. 91533/1989. Other useful compounds are described in Horiguchi.Hiroshi, "Bokin Bobai no Kagaku", Sankyn Publishing K.K. 1982, and Nippon Bokin Bobai Society, "Bokin Bobai Gijutu Handbook (Antifungal & Antibacterial Engineering Handbook)", Hakuhodo K.K., 1986.

Where washing is done with a smaller amount of water in the practice of the invention, it is preferred to place squeeze roller washing tanks as disclosed in JP-A 18350/1988 or to employ a washing arrangement as disclosed in JP-A 143548/1988.

Overflow solution exits from the washing or stabilizing bath as water having any anti-bacterial means applied thereto is replenished with the progress of processing. Part or all of the overflow solution may be used as a processing solution having a fixing function in the preceding step as disclosed in JP-A 235133/1985.

While the photographic silver halide photosensitive material is processed according to the invention in an automatic processor including at least developing, fixing, washing (or stabilizing) and drying steps as mentioned above, the overall process from development to drying should preferably be completed within said processing proceeds in a total dry-to-dry processing time of less than 100 seconds. In a preferred embodiment said processing even proceeds in a total dry-to-dry processing time of less than 70 seconds. More specifically, the time taken from the start point of time when the leading edge of a photosensitive material film or sheet enters the developer, past the fixing, washing (or stabilizing) and drying steps, to the end point of time when the leading edge exits the drying section, which is known as a dry-to-dry time, proceeds within a total processing time of from 30 up to 100 seconds, and more preferably from 35 up to 70 seconds. Comparable desired total processing times have e.g. been set forth in EP-A's 0 678 772, 0 709 730, 0 712 034 and 0 712 036.

From the detailed description hereinbefore it is clear that the present invention clearly provides a method of processing black-and-white light-sensitive silver halide photographic materials having photosensitive emulsions rich in silver chloride with ascorbic acid type developers wherein said processing is performed at low replenishment rates (less than 150 ml/m$^2$) in order to get a stable or constant sensitometry, even over long working periods with low total amounts of materials to be developed and that the specific feature is that the said material having low coating amounts of silver halide has a buffering capacity of less than 6 mmole/m$^2$.

Thereby problems are thus encountered with respect to the constancy of the pH of the ascorbic acid type developer, use of amounts of buffering agents in huge amounts and combination of differing buffer solutions, use of developer replenishers having a higher pH than the pH of the developer and all measures taken in order to decrease deactivation of the developer composition when no material is processed.

Having described in detail preferred embodiments of the current invention, it will now be apparent to those skilled in the art that numerous modifications can be made therein without departing from the scope of the invention as defined in the appending claims and in following examples.

EXAMPLES

Example 1

This Example gives an indication why pH decrease is more important for ascorbic acid type developers than for hydroquinone developers.

In FIG. 1 changes in pH at processing temperature as a function of time (expressed in "days") are illustrated: in an open beaker in order to promote contact with atmospheric oxygen, said open beaker containing as developing solutions G118, trademarked developer from Agfa-Gevaert, the pH of which is 10.20;

L10030$_{13}$ 01, experimental developer containing iso-ascorbic acid, the pH of which is 10.00; and L10030_01, experimental developer containing iso-ascorbic acid, the pH of which is 10.50; respectively.

From FIG. 1 it can easily be concluded that there are clear differences in pH behaviour of a hydroquinone developer (where a pH increase is detected at the start of the processing) and an ascorbic acid type developer, showing a continuous pH decrease: the higher pH at the start, the quicker the decrease.

Example 2

This Example is illustrative for the dependence of sensitometric effects (for sensitivity, also called "speed") as a function of pH of an ascorbic acid type developer (experimental developer L10030$_{13}$ 01 and L10031$_{13}$ 01 as experimental fixer the composition of which is given hereinafter) and a hydroquinone developer (G138i, trademark product from Agfa-Gevaert, used in the processing in combination with G334c as trademarketed fixer from Agfa-Gevaert):

| Composition of developer L10030-01: | |
|---|---|
| potassium metabisulfite | 23.0 g |
| potassium thiocyanate | 1.0 g |
| potassium bromide | 1.0 g |
| Trilon B | 2.1 g |
| hydroxyethyl diphosphonic acid (di-sodium salt) | 0.8 g |
| polyethylene glycol 400 | 20.0 g |
| potassium carbonate | 95.6 g |
| sodium isoascorbate.1 aq. | 61.5 g |
| methyl benzotriazole (mixture of 4- and 5- derivative) | 30 mg |
| 1-phenyl-4,4'-hydroxymethyl-methyl-pyrazo-lidine-3-one | 2.0 g |
| demineralized water | 400 ml |
| acetic acid | 12.2 g |

Addition of water up to a volume of 1 liter.
pH: 9.65

| Composition of fixer L10031-01: | |
|---|---|
| ammonium thiosulfate | 138.0 g |
| sodium metabisulfite | 20.0 g |
| sodium acetate.3aq. | 32.5 g |
| acetic acid | 7.8 g |

Addition of water up to a volume of 1 liter.
pH: 4.90
Processor: Agfa HT330-U (trademark product from Agfa-Gevaert)
Processing time: 1 minute processing.
The tested Materials were following:
Agfa Curix Ortho DGU (trademark product from Agfa-Gevaert) having silver bromoiodide grains;
AgCl "Curix Ortho Dry" material having silver chloroiodide grains.

The preparation of the respective emulsion grains and the composition of the materials is given hereinafter.

Emulsion Preparation for the Agfa Curix Ortho DGU Material Having Silver Bromoiodide Grains.

Three solutions were used during the precipitation of the (silver bromoiodide) emulsion crystals:

Solution 1: 1.5 liter of an aqueous solution containing 500 grams of silver nitrate (1.96 N solution of silver nitrate);

Solution 2: 0.525 liter of an aqueous solution containing 175 grams of potassium bromide (1.96 N solution of potassium bromide).

Solution 3: 0.975 liter of an aqueous solution containing 320 grams of potassium bromide and 5 grams of potassium iodide (1.93 N potassium bromide; 0.03 N potassium iodide).

An emulsion having silver iodobromide emulsion crystals containing 1.0 mole % of silver iodide was prepared by following preparation steps, making use of the 3 solutions as set forth hereinbefore:

a nucleation and a first neutralization step, a second neutralization step and a growth step, followed by a third and a fourth neutraliza-tion step, and a second growth step.

Precipitation proceeded, making use of the double jet technique with continuous control of the pAg or pBr value, said value being defined as the negative logarithm of the silver ion or of the bromide ion concentration respectively, and with application, where required, of continuously varying addition rates of solutions to the reaction vessel.

Nucleation Step:

8 ml of solutions 1 and 2 were introduced into a reaction vessel in 30 seconds using the double jet technique. Said reaction vessel initially contained 3 liter of demineralized water at 51° C., 1.5 grams of potassium bromide and 5.5 grams of oxidized gelatin (pH adjusted at a value of 1.8; pBr=2.39). After 90 s the reaction temperature of this mixture was raised to 700° C. in 25 minutes, pH was adjusted at a value of 6.0 and after 210 s 500 ml of an aqueous solution (10% by weight) of phthalated gelatin were added. After another 330 s waiting time a first neutralization step was started.

First and Second Neutralization Steps:

In a time of 330 s at a rate of 7.5 ml/min. solution 2 was run into the reaction vessel, before starting a second neutralization step, during which solution 1 was run during 60 s at a rate of 7.5 ml/min. while simultaneously running solution 2 in the reaction vessel at a rate in order to maintain a constant pAg value of 8.85, whereafter growth was started.

First Growth Step:

A double jet precipitation was started using solutions 1 and 2 which continued for 33 minutes 22 seconds. During this precipitation, the pAg value was kept constant at 8.85, by continuously adjusting the addition rate of solution 2, while adding 510 ml of solution 1 at a starting rate of 7.5 ml per minute, linearly increasing it to 23.1 ml per minute at the end. Thereafter the third neutralization step was started.

Third and Fourth Neutralization Steps:

Solution 1 was added at a rate of 7.5 ml per minute during 440 s, immediately followed by a fourth neutralization step during which solution 1 was run during 100 s at a rate of 7.5 ml/min. while simultaneously running solution 2 in the reaction vessel at a rate in order to maintain a constant pAg value of 7.38, whereafter a second growth step was started.

Second Growth Step:

A double jet precipitation was started using solutions 1 and 2 which continued for 40 minutes 56 seconds. During this precipitation, the pAg value was kept constant at 7.38, by continuously adjusting the addition rate of solution 2, while adding 907 ml of solution 1 at a starting rate of 7.5 ml per minute, linearly increasing it up to 36.8 ml per minute at the end of the precipitation.

After addition of sulphuric acid to a pH value of 3.5 stirring was stopped and after sedimentation the supernatant liquid was removed. The washing procedure was started after a scrape-rudder was installed and after addition of polystyrene sulphonic acid in the first turn to get a quantitative flocculate without silver losses.

During redispersion of the emulsion 150 g of gelatin were added in order to get a weight ratio of gelatin to silver nitrate of 0.4, the emulsion containing an amount of silver bromoiodide equivalent with 190 g of silver nitrate per kg.

After redispersion, every example was analysed using shadowed carbon replicas obtained with an electron microscope. For each example a minimum of hundred grains were measured and the following characteristics were then calculated and a characterization of the crystal population of an emulsion was given by average thickness (t): calculated as the average by number from the distance between the main planes measured for all crystals;

percentage of the total projective surface (% P.O.): procentual part, expressed as silver, of the total projective area covered by the tabular grains;

average equivalent volume diameter (EVD): average diameter, calculated from the average volume of all grains, expressed as diameter of a sphere having the same volume of the corresponding tabular crystal.

Emulsion grains prepared as described hereinbefore had following characteristics: t=0.18 $\mu$m; % P.O.=more than 95%; EVD=0.75 $\mu$m The emulsion crystals were chemically ripened with sulphur and gold in the presence of green light absorbing dye anhydro-5,5'-dichloro-3,3'-bis(n-sulphobutyl)-9-ethyloxacarbocyanine hydroxide.

Following amounts of ingredients were added to the emulsion in order to provide chemical ripening:

540 mg of potassium thiocyanate;

4 mg of sodium thiosulphate (including 5 moles of water per mole of the crystals, further indicated as "5aq.");

0.7 mg of gold thiocyanate (including 4 moles of water per mole of the crystals, further indicated as "4aq.").

The solutions for the emulsion coating and for the protective coating were coated simultaneously on both sides of a polyethylene terephthalate film support having a thickness of 175 $\mu$m, together with a protective layer containing per side and per square meter 1.1 g of gelatin and an emulsion layer having 3.5 g of silver, expressed as equivalent amount of silver nitrate.

Compositions of emulsion layers and of protective layers are given hereinafter in the Tables 1 and 2 hereinafter respectively.

TABLE 1

| Compound (amounts per mole silver halide) | Emulsion layer |
|---|---|
| 4-hydroxy-6-methyl-1,3,3a,7-tetraazaindene | 87 mg |
| 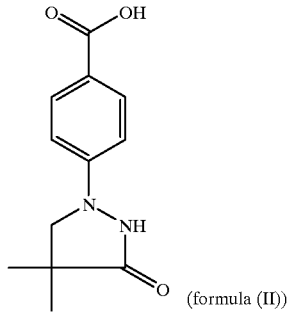 (formula (II)) | |
| 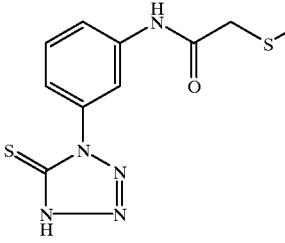 (formula (III)) | 33 mg |
| sorbitol | 15.5 g |
| polyethylacrylate, latex plasticizer | 12 g |
| resorcinol | 2.8 g |
| potassium bromide | 160 mg |
| polydextran (M.W. 10,000) | 15 g |

The coating solutions of the emulsion layers were prepared by adding solutions of the compounds indicated in Table 1 to the melted emulsion while stirring. The coating solution of the protective layer is given in Table 2.

Following coating agents, sumarized in Table 2, were added to the solution of the protective coating before coating the protective antistress layer.

TABLE 2

| Compound | amounts per m² |
|---|---|
| gelatin | 1.1 g |
| polymethylmethacrylate spacing agent (average particle diameter 3 μm) | 15 mg |
| 4-hydroxy-6-methyl-1,3,3a,7-tetraazaindene | 82 mg |
| bis-metasulphophenyl-disulphide | 4 mg |
| $CF_3—(CF_2)_6—COOH.NH_3$ | 7.5 mg |
| $CF_3—(CF_2)_6—CONH—(CH_2CH_2O)_{17-20}—H$ | 19 mg |
| phenol | 150 mg |

TABLE 2-continued

| Compound | amounts per m² |
|---|---|
| 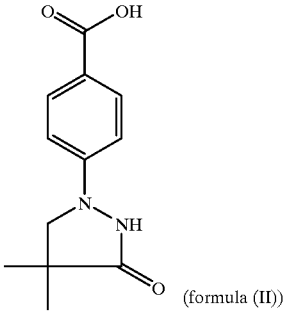 (formula (II)) | 5 mg |
| Mobilcer Q (a paraffin wax, trade name product from MOBIL OIL) | 25 ml |
| polythioether A[(a)] | 5 mg |
| formaldehyde (added just before coating) | 100 mg |
| latex of a cross-linked ionic polymer is poly ([c.l.]tetraallyloxyethane-co-methyl acrylate/acrylic acid), with a 3/18/79 molar ratio. | 167 mg |

[(a)]in Table 4 is polythioether A, a modified poly-epichloorhydrine having an average chain length of approximately 20 monomer units and of which about 50% of the chloride groups have been replaced by a —S—CH$_2$—CHOH—CH$_2$OH substituent.

Between the support and the emulsion layer a layer comprising a antihalation dye was coated on both sides of the support. The coating thereof was performed by means of the slide hopper technique. The wet coating thicknesses of the dye layer (also called antihalation layer), the emulsion layer and the protective layer were 10, 44 and 25 μm respectively. Per m² and per side the antihalation layer was containing 0.19 g of gelatin and 0.100 g of the dye the composition of which is given hereinafter in formula (IV).

Formula (IV)

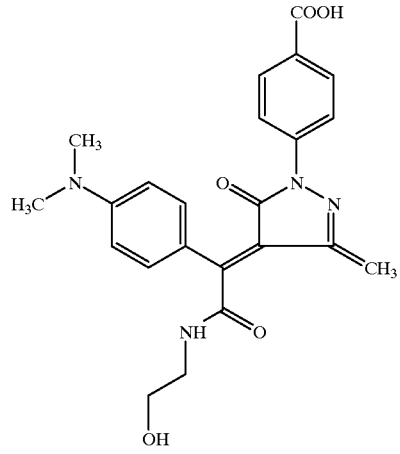

Emulsion Preparation for the AgCl Agfa Curix Ortho Dry Material Having Silver Chloroiodide Grains.

Emulsions comprising tabular AgCl(I) crystals having {111} major planes were prepared as follows.

The following solutions were prepared:

3 l of a dispersion medium (C) containing 0.444 moles of sodium chloride, 15 g of inert gelatin and 270 mg of adenine; temperature was established at 45° C. and pH was adjusted to 5.5;

a 2.94 molar silver nitrate solution (A);

a solution containing 4.476 moles of sodium chloride, 0.0224 moles of potassium iodide and 420 mg of adenin (B1).

A nucleation step was performed by introducing solution A and solution B1 simultaneously in dispersion medium C both at a flow rate of 30 ml/min during 30 seconds. After a physical ripening time of 15 min during which the temperature was raised to 70° C. and 97.5 g of gelatin and 1500 ml of water were added and the mixture was stirred for an additional 5 minutes. Then a growth step was performed by introducing by a double jet during 66 minutes solution A starting at a flow rate of 7.5 ml/min and linearly increasing the flow rate to an end value of 37.5 ml/min, and solution B1 at an increasing flow rate as to maintain a constant mv-value, measured by a silver electrode versus a saturated calomel electrode (S.C.E.), of +92 mV. For this emulsion an iodide content in the silver chloroiodide tabular crystals of 1.3 mole % was obtained by adding a further amount of 0.8 mole % of iodide at the end of the preparation stage.

To this dispersion medium an amount of 1.25 mmole per mole of silver chloride was added of the dye anhydro-5,5'-dichloro-3,3'-bis(n-sulphobutyl)-9-ethyloxacarbocyanine hydroxide. After cooling to about 40° C. the pH value of the said dispersing medium was adjusted to a value of 3.0 with sulphuric acid, and after the addition of 55.5 ml of polystyrene sulphonic acid the obtained flocculate was decanted and washed three times with an amount of 6 l of demineralized water in order to remove the soluble salts present. The thus obtained silver chloride tabular emulsion showed following grain characteristics.

The average diameter $d_{EM}$, average thickness "t", average aspect ratio AR were obtained from electron microscopic photographs: the diameter of the grain was defined as the diameter of the circle having an area equal to the projected area of the grain as viewed in the said photographs. Moreover the average sphere equivalent diameter $d_{EM}$ obtained from the measurement of electric reduction currents obtained by reduction of a silver halide grain with a microscopically fine electrode is given: the sphere equivalent diameter was defined as the diameter of a hypothetical spherical grain with the same volume as the corresponding tabular grain. So a value for "$d_{EM}$" of 1.27 μm, a value for "t" of 0.14 μm and of AR of 8.8 was found.

Before the start of the chemical ripening the mV-value of the emulsion was adjusted at +120 mV with sodium chloride and the pH-value at 5.5 with sodium hydroxide.

Ripening agents causing a different composition of the ripening solutions used were: tetramethyl selenoureum and gold thiocyanate and toluene thiosulphonic acid was used as predigestion agent. Amounts of chemical ripening agents were optimized in order to obtain an optimal fog-sensitivity relationship after 2 hours at 57° C.

The emulsion crystals were chemically ripened in the presence of green light absorbing dye anhydro-5,5'-dichloro-3,3'-bis(n-sulphobutyl)-9-ethyloxacarbocyanine hydroxide and anhydro-5,5'-dicyano-3,3'-bis-(N-acetoxyethyl)-1,1'-ethyl-benzimidazolocarbocyanine (added in an amount of 0.03 mmole per mole of silver).

Addenda added to the silver chloroiodide emulsion were the same as disclosed hereinbefore except for the absence in the emulsion layer of potassium bromide in the material rich in silver chloride (Curix Ortho Dry) and the stabilization of the emulsion rich in silver chloride in an amount of 30 mg per mole of silver of the phenylmercaptotetrazole compound the formula of which is given hereinafter, instead of the 4-hydroxy-6-methyl-1,3,3a,7-tetraazaindene given in Table 2.

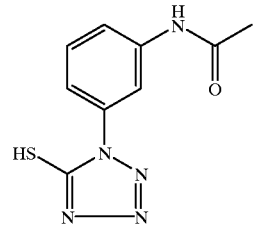

Formula (V)

During processing the temperature used for the combination developer/fixer combination G138i/G334c in order to process the "Agfa Curix Ortho DGU" film material is 38° C.

For processing in developer/fixer combination L10030_01/L10031$_{13}$ 01 of the "Agfa Curix Ortho Dry" film material the temperature was 35° C. Table 3 illustrates changes in speed (sensitivity) obtained in the above mentioned processing cycles as a function of pH of the developer.

TABLE 3

| L10030_01 / L10031_01 | | | | G138i / G334c | |
|---|---|---|---|---|---|
| Curix Ortho Dry | | Curix Ortho DGU | | Curix Ortho DGU | |
| pH | Speed (Fog + 1.0) | pH | Speed (Fog + 1.0) | pH | Speed (Fog + 1.0) |
| 8.50 | 221 | 8.50 | 254 | 9.52 | 170 |
| 8.75 | 199 | 8.75 | 198 | 9.77 | 166 |
| 9.00 | 191 | 9.00 | 190 | 9.98 | 164 |
| 9.25 | 178 | 9.25 | 176 | 10.10 | 164 |
| 9.50 | 170 | 9.50 | 166 | 10.18 | 164 |
| 9.75 | 164 | 9.75 | 159 | 10.25 | 164 |
| 10.00 | 159 | 10.00 | 154 | 10.31 | 163 |
| 10.25 | 159 | 10.25 | 152 | 10.38 | 163 |

From the data given in Table 3 it is clear that changes in sensitivity (speed) are remarkably higher for the "Agfa Curix Ortho DGU" film material if processed in an ascorbic acid type developer. Changing pH from 9.5 to 10.25 makes increase sensitivity with 0.14 log It (log E(xposure)) in ascorbic acid type developer L10030_01, whereas in a hydroquinone type developer G138 i changes in speed are reduced to 0.06 log It. For an identical pH change the "Agfa Curix Ortho Dry" film material shows a change in speed of 0.11 log It in L10030$_{13}$ 01.

Example 3

In this Example an indication and an explanation is given why pH decrease occurs during development of an unexposed material in case of exhaustion of the developer.

Exhaustion experiments were therefore performed in "Agfa Gevaset N437" processor (tradename product from Agfa-Gevaert). The acidification was explained only partly as being due to aerial oxidation and acidification due to silver reduction; but the other part was not explainable and was, as a first approach, due to the presence of certain ingredients or compounds in the layers of the film material. An experiment without and with processing unexposed material in a developer and fixer based on L10030-01 and L10031-01 respectively was performed.

It was accepted that in case of an experiment with processing of unexposed material no remarkable acidification or exhaustion would appear due to the absence of reduction of (unexposed) silver halide grains and little aerial oxidation and that further exhaustion would not appear either. The experiment was performed so that during the absence of processing of unexposed film, the rollers were kept turning and the temperature in the processor was at operational level.

Therefore per hour 2 m² of unexposed material was processed and changes of pH as a function of time (in hours) were measured and registered in FIG. 2. As is clear from FIG. 2 also in the absence of reduction of silver halide grains and thus without development a strong pH decrease can be observed. A pH decrease of 0.3 pH units is indicative for a loss in sensitivity of about 0.05 to 0.06 log It. It is clear that this acidification is not caused by a development reaction and is not caused by aerial oxidation.

Example 4

This Example is illustrative for the relationship between pH changes by titration of destructed film materials having been coated with layers having small and large buffering capacities respectively.

Therefore 0.15 square meter of unexposed film material was cut into small pieces (10 mm×3 mm). The film pieces are brought into 500 ml of deionized water at room temperature and stirred. By addition of 0.1 M of NaOH solution in water the pH of the solution was slowly increased and the pH of the solution in equilibrium with the film was measured as a function of the amount of NaOH added. The addition was slow, in order to obtain a good equilibrium between film and fluid (typically from pH 7 to pH 10 within a time of 3 hours). The data were calculated per square meter of film.

Titration curves thus obtained are given in FIG. 3 hereinafter for 2 different materials: a double-side coated "Agfa Curix Ortho Dry" material composed of a subbing layer, an antihalation undercoat, an emulsion layer and a protective antistress layer as disclosed hereinbefore at one hand, and a single-side coated laser film material, the composition of which is given in EP-A 0 794 456 and the corresponding U.S. Pat. No. 5,712,081, Example 1, composed of an emulsion layer, a protective antistress layer and a backing layer at the other side of the support and called "LT2000B" in the present Example. As can be concluded from the curves in FIG. 3 the amount of alkali (mmoles or meq/square meter) in order to get the same pH increase is much lower for the double-side coated "Agfa Curix Ortho Dry" radiographic material than for the single-side coated "LT2000B" material.

As the amount of alkali needed in order to obtain the pH of the developing solution in which the film should be developed, the "buffering capacity" of the double-side coated "Agfa Curix Ortho Dry" radiographic material is lower those for the single-side coated "LT2000B" material.

Example 5

Gives an indication why no low replenishing amounts can be achieved with materials having photosensitive layers containing silver halide crystals rich in silver bromide.

Therefore a comparison was made between "Curix Ortho DGU" (Coating No.39145050) (trademarketed radiographic film material from Agfa-Gevaert, having silver bromoiodide grains) and "Curix Ortho Dry" (Coating No.39345028) the composition of which has been given hereinbefore. Sensitometric data (fog F, sensitivity S, gradations GGV, GG and GG2, densities DO and DLT (density latitude) are summarized in the Tables 4 and 5 as a function of amounts of KCl and of KBr respectively per liter of developer.

TABLE 4

Curix Ortho Dry No.39345028

|  | F | S | GGV | GG | GG2 | DO | DLT |
|---|---|---|---|---|---|---|---|
| Comparative | 293 | 164 | 187 | 331 | 429 | 303 | 360 |
| 1.25 g KCl/1 | 292 | 164 | 189 | 331 | 435 | 290 | 345 |
| 2.50 g KCl/1 | 285 | 164 | 190 | 333 | 430 | 302 | 358 |
| 3.75 g KCl/1 | 295 | 164 | 185 | 327 | 415 | 284 | 341 |
| 5.00 g KCl/1 | 293 | 165 | 187 | 327 | 419 | 278 | 333 |
| 6.25 g KCl/1 | 299 | 165 | 183 | 319 | 396 | 272 | 328 |
| 9.38 g KCl/1 | 301 | 163 | 190 | 317 | 389 | 278 | 333 |
| 12.51 g KCl/1 | 295 | 163 | 191 | 318 | 395 | 291 | 349 |
| 17.51 g KCl/1 | 295 | 164 | 186 | 314 | 398 | 287 | 342 |

TABLE 5

Curix Ortho DGU No.39145050

|  | F | S | GGV | GG | GG2 | DO | DLT |
|---|---|---|---|---|---|---|---|
| Comparative | 254 | 160 | 180 | 284 | 327 | 299 | 381 |
| 1.00 g KBr/1 | 248 | 161 | 181 | 280 | 313 | 293 | 378 |
| 3.00 g KBr/1 | 241 | 164 | 182 | 269 | 287 | 282 | 370 |
| 5.00 g KBr/1 | 240 | 164 | 182 | 268 | 285 | 281 | 368 |
| 7.00 g KBr/1 | 240 | 165 | 178 | 255 | 264 | 272 | 362 |
| 9.00 g KBr/1 | 235 | 170 | 171 | 233 | 226 | 250 | 344 |
| 14.0 g KBr/1 | 232 | 175 | 161 | 207 | 192 | 228 | 323 |
| 19.0 g KBr/1 | 230 | 180 | 152 | 189 | 168 | 212 | 308 |

As can be concluded from the Tables 4 and 5, the presence of increasing amounts of bromide-ions present in the developer for materials having crystals rich in silver bromide is quickly leading to loss in speed, contrast and density if compared with the presence of increasing amounts of KCl present in the developer for materials having crystals rich in silver chloride. These data are indicative for the fact that for materials having crystals rich in silver bromide more developer repelenisher is required in order to get a constant symmetry.

Clearly lower replenishing amounts for materials having crystals rich in silver chloride are sufficient in order to provide a constant sensitometry, since accumulation of chloride-ions due to the development reaction does not have large sensitometric effects.

Example 6

Is illustrative for the use of base per coated layer in the "Curix Ortho Dry" material used in the method of the present invention.

Therefore an experiment was set up wherein for the "Curix Ortho Dry" material acidification was measured quantitatively per coated layer of the unexposed photographic material. Coating solutions were therefore taken before coating and titrated just as given hereinbefore in order to make a comparison possible with the coated material.

Representative amounts were titrated and used amounts of base up to a pH of 9.65 for the differing layers composing the said material were put together in Table 6.

TABLE 6

| Layer | Base amounts (meq/m²) |
| --- | --- |
| Support + Subbing Layer | 0.35 |
| Antihalation Undercoat | 0.98 |
| Emulsion Layer | 0.91 |
| Anti-stress Layer | 4.40 |
| Total | 6.64 |

From the data in Table 6, it can unambiguously be concluded that most of all base consumed as set forth is generated from the protective antistress layer. It is clear that in order to make a suitable material for low regeneration ascorbic acid type development, the buffering capacity of the protective antistress layer should decrease!

Example 7

Is illustrative for batch-processing of materials having differing acid contents and the use of base per coated layer in the said material. Developer, fixer and rinsing unit in the "Gevaset N437" processing machine were filled with 900 ml of L10030$_{13}$ 01 developer, 900 ml of L10031$_{13}$ 01 fixer and rinsing water (twice).

As a comparative film material 4 m² of "Curix Ortho Dry" film 39345028 was processed, wherein ⅓ of the film material was exposed and ⅔ was unexposed in order to approximate the real situation. Change of pH in the developer and sensitometry of the developed material were followed during exhaustion of the developer. Results thereof are given in Table 7 and in FIG. 4 respectively.

The inventive material was a material wherein no antihalation undercoat was present and wherein, in order to compensate for the loss in sharpness due to the absence of the filter or antihalation dye given in the paragraph following Table 2, the benzoxacarbocyanine and the benzimidazolocarbocyanine spectral sensitizers were replaced respectively by anhydro-5,5'-dichloro-3,3'-bis(n-sulphopropyl)-9-ethyloxacarbocyanine hydroxide and by the symmetric benzimidazolocarbocyanine dye, the structure of which is given hereinafter in formula (VI)

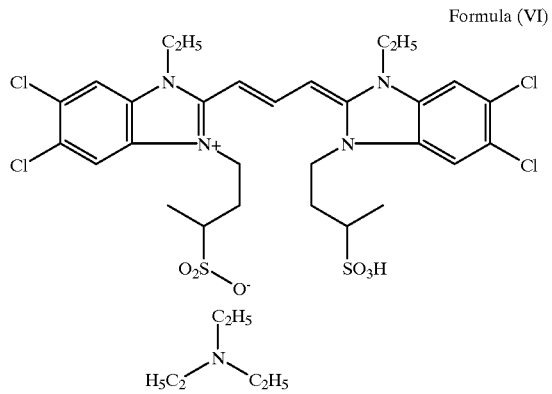

Formula (VI)

Moreover, the latex and the p-carboxy-substituted phenidone given in Table 2 were omitted in the composition of the protective antistress layer.

It is clear from Table 7 hereinafter that if the material used in the method of the present invention is developed in exhausted developer that there is a much lower change in pH by development of the inventive material used in the method of the present invention: pH changes are −0.10 and −0.24 for the inventive and for the comparative material respectively as illustrated in the FIG. 4, representing the same data.

TABLE 7

| Film(m2) | pH | F | S | GGV | GG | GG2 | DO | DLT |
| --- | --- | --- | --- | --- | --- | --- | --- | --- |
| CurixOrtho Dry39345028 | | | | | | | | |
| 0 | 9.53 | 269 | 176 | 168 | 272 | 323 | 289 | 350 |
| 1 | 9.51 | 321 | 177 | 174 | 273 | 310 | 289 | 363 |
| 2 | 9.43 | 280 | 183 | 162 | 243 | 259 | 275 | 353 |
| 3 | 9.37 | 284 | 183 | 158 | 249 | 285 | 277 | 355 |
| 4 | 9.29 | 301 | 185 | 160 | 238 | 258 | 265 | 348 |
| Inventive. | | | | | | | | |
| 0 | 9.50 | 284 | 182 | 169 | 267 | 309 | 290 | 358 |
| 1 | 9.47 | 315 | 182 | 178 | 290 | 348 | 295 | 360 |
| 2 | 9.46 | 274 | 182 | 167 | 269 | 304 | 282 | 350 |
| 3 | 9.44 | 307 | 185 | 168 | 261 | 289 | 274 | 346 |
| 4 | 9.40 | 266 | 181 | 169 | 269 | 309 | 281 | 349 |

As is clear from sensitometric data given in Table 7 a more stable sensitometry is obtained for inventive material used according to the method of the present invention: whereas the said inventive material doesn't show changes in sensitivity (speed) and contrast as a function of numbers of developed square meters of film in exhausted develper this is clearly the case for the comparative material showing loss in speed with 0.10 log It and contrast at higher densities with 5%.

The inventive material has a ratio of buffering capacity to silver content in the undeveloped film below 0.6 and even below 0.4, wherin said silver content has been expressed as an equivalent amount of silver nitrate. Opposite thereto the said ratio is even higher than 0.8 for the comparative material.

Having described in detail preferred embodiments of the current inventin, it will now be apparent to those skilled in the art that numerous modifications can be made therein without departing from the scope of the invention as defined in the following claims.

We claim:

1. Method of processing an exposed black-and-white light-sensitive silver halide photographic material having silver halide, coated in an amount, expressed as an equivalent amount of silver nitrate of less than 6 g/m², said method comprising the steps of developing, fixing, rinsing and drying, making use in the developing step of an ascorbic acid type developer and an equivalent developer replenisher providing a regeneration amount of less than 150 ml/m², characterized in that the said material has a buffering capacity of less than 6 mmole/m², wherein said buffering capacity is defined as amount of alkali, expressed in mmole/square meter of film required to bridge across pH differences between the material and the developer.

2. Method according to claim 1, wherein said material has a ratio of buffering capacity to silver content in the undeveloped film, said silver content being expressed as equivalent amount of silver nitrate, below 0.6.

3. Method according to claim 1, wherein said material comprises a support and on at least one side thereof at least one light-sensitive emulsion layer having tabular emulsion grains rich in silver chloride.

4. Method according to claim 3, wherein said tabular grains are {111} tabular grains accounting for at least 50% of the total projective area of all grains, having at least 90 mole % of silver chloride and not more than 1 mole % of silver iodide.

5. Method according to claim 4, wherein said tabular grains are {100} tabular grains accounting for at least 30% of the total projective area of all grains, having at least 90 mole % of silver chloride and not more than 1 mole % of silver iodide.

6. Method according to claim 1, wherein said material comprises a support and on at least one side thereof at least one light-sensitive emulsion layer having cubic emulsion grains rich in silver chloride.

7. Method according to claim 3, wherein said grains are chemically ripened with agents providing sulphur, selenium and gold ions.

8. Method according to claim 1, wherein said ascorbic acid type developer comprises as a main developing agent or compound, the compound according to the formula (I)

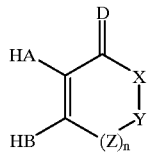

(I)

wherein in the formula (I) each of A, B and D independently represents an oxygen atom or $NR^1$;

X represents an oxygen atom, a sulfur atom, $NR^2$; $CR^3R^4$; C=O; C=NR$^5$ or C=S;

Y represents an oxygen atom, a sulfur atom, $NR'^2$; $CR'^3R'^4$; C=O; C=NR'$^5$ or C=S;

Z represents an oxygen atom, a sulfur atom, $NR''^2$; $CR''^3R''^4$; C=O; C=NR''$^5$ or C=S;

n equals 0, 1 or 2;

each of $R^1$ to $R^5$, $R'^2$ to $R'^5$ and $R''^2$ to $R''^5$ independently represents hydrogen, alkyl, aralkyl, hydroxyalkyl, carboxyalkyl, alkenyl, alkynyl, cycloalkyl, cycloalkenyl, aryl or heterocyclyl; and wherein $R^3$ and $R^4$, $R'^3$ and $R'^4$, $R''^3$ and $R''^4$, may further form a ring together; and wherein in the case that $X=CR^3R^4$ and $Y=CR'^3CR'^4$, $R^3$ and $R'^3$ and/or $R^4$ and $R'^4$ may form a ring and in the case that $Y=CR'^3R'^4$ and $Z=CR''^3CR''^4$ with n=1 or 2, $R^3$ and $R'^3$ and/or $R^4$ and $R'^4$ may form a ring.

9. Method according to claim 1, wherein said processing proceeds in a total dry-to-dry processing time of less than 100 seconds.

* * * * *

UNITED STATES PATENT AND TRADEMARK OFFICE
CERTIFICATE OF CORRECTION

PATENT NO. : 6,066,441
DATED : May 23, 2000
INVENTOR(S) : Benedictus Jansen et al It is certified that error appears in the above-identified patent and that said Letters Patent is hereby corrected as shown below:

Column 25,
Line 33, "700 °C" should read -- 70 ° C --.

Column 34,
Line 32, "5%" should read -- 15% --.
Line 35, "wherin" should read -- wherein --.
Line 40, "invention" should read -- invention --.

On the title page, insert Foreign Priority Data as follows:

-- Foreign Application Priority Data
June 5, 1998 [EP] European..........98201862 --.

Signed and Sealed this

Seventh Day of August, 2001

*Attest:*

*Attesting Officer*

NICHOLAS P. GODICI
*Acting Director of the United States Patent and Trademark Office*